(12) United States Patent
Nagaoka

(10) Patent No.: US 8,049,969 B2
(45) Date of Patent: Nov. 1, 2011

(54) ZOOM LENS SYSTEM AND IMAGE PICKUP APPARATUS USING THE SAME

(75) Inventor: Hideyuki Nagaoka, Hino (JP)

(73) Assignee: Olympus Imaging Corp., Tokyo (JP)

( * ) Notice: Subject to any disclaimer, the term of this patent is extended or adjusted under 35 U.S.C. 154(b) by 28 days.

(21) Appl. No.: 12/658,488

(22) Filed: Feb. 4, 2010

(65) Prior Publication Data

US 2010/0202064 A1 Aug. 12, 2010

(30) Foreign Application Priority Data

Feb. 9, 2009 (JP) ................................. 2009-027323

(51) Int. Cl.
*G02B 15/14* (2006.01)
(52) U.S. Cl. ....................................... 359/682; 359/686
(58) Field of Classification Search .......... 359/680–682, 359/686

See application file for complete search history.

(56) References Cited

U.S. PATENT DOCUMENTS

| | | | |
|---|---|---|---|
| 6,452,729 B2 | 9/2002 | Yamamoto | |
| 2001/0036020 A1 | 11/2001 | Yamamoto | |
| 2010/0053767 A1* | 3/2010 | Katakura | 359/686 |
| 2010/0165480 A1* | 7/2010 | Yamaguchi et al. | 359/686 |

FOREIGN PATENT DOCUMENTS

| | | |
|---|---|---|
| JP | 2001-343587 | 12/2001 |
| JP | 2004-117828 | 4/2004 |
| JP | 2006-208889 | 8/2006 |
| JP | 2008-180901 | 8/2008 |

* cited by examiner

*Primary Examiner* — Darryl J Collins
(74) *Attorney, Agent, or Firm* — Kenyon & Kenyon LLP

(57) ABSTRACT

A zoom lens system includes in order from an object side to an image side, a first lens unit having a negative refracting power, a second lens unit having a positive refracting power, a third lens unit having a negative refracting power, and a fourth lens unit having a positive refracting power. At the time of zooming from a wide angle end to a telephoto end, distances between the lens units change by at least the first lens unit, the second lens unit, and the third lens unit being moved. The second lens unit includes in order from the object side, a first sub-unit having a positive refracting power, a second sub-unit having a negative refracting power, and a third sub-unit having a positive refracting power. A surface on the object side and a surface on an image side of each of the first sub-unit, the second sub-unit, and the third sub-unit are in contact with air, and (the zoom lens system) satisfies the following conditional expression (1).

$$3.2 < (\beta_{2t}/\beta_{2w})/(\beta_{3t}/\beta_{3w}) < 7 \quad (1)$$

26 Claims, 13 Drawing Sheets

ZOOM LENS SYSTEM AND IMAGE PICKUP APPARATUS USING THE SAME

CROSS-REFERENCE TO RELATED APPLICATION

The present invention is based upon and claims the benefit of priority from the prior Japanese Patent Application No. 2009-027323 filed on Feb. 9, 2008; the entire contents of which are incorporated herein by reference.

BACKGROUND OF THE INVENTION

1. Field of the Invention

The present invention relates to a zoom lens system and an image pickup apparatus using the same.

2. Description of the Related Art

In recent years, replacing a film camera, a digital camera in which, an object is photographed by using an image pickup device such as a CCD (Charge Coupled Device) and a CMOS (Complementary Metal Oxide Semiconductor) has become mainstream. Furthermore, in the field of digital cameras, there are several categories of digital cameras in a wide range from a high-function type for professional use to a compact popular type.

A user of a digital camera of a type belonging to the popular compact type seeks to enjoy photography by capturing readily various scenes at any time and anywhere.

Therefore, a small-size product, or a digital camera of a slim type which can be accommodated easily in a pocket of clothes or a bag, and carried conveniently has been preferred. Consequently, further small-sizing of a photographic lens system as well has been sought.

Whereas, there is a tendency towards an increase in the number of pixels of an image pickup element. Therefore, a high optical performance which deals with a large number of pixels of the image pickup element has been sought. Furthermore, for securing a mass productivity, it is necessary to suppress a sensitivity of degrading of the optical performance corresponding to a manufacturing error in a processing of lenses and an assembling process.

Moreover, from a point of view of widening a photography area, a zoom lens of a class with a zooming ratio of five times or seven times is becoming common, and further increase in the zooming ratio has been expected. Meanwhile, widening of an angle of field has also been expected. Zoom lens systems of various types have been proposed in response to such demands.

As a zoom lens system having a comparatively wide angle of field and high zooming ratio, and which is compact, a zoom lens system of a type which includes in order from an object side, a first lens unit having a negative refracting power, a second lens unit having a positive refracting power, a third lens unit having a negative refracting power, and a fourth lens unit having a positive refracting power has been known. For example, a zoom lens system of this type having a zooming ratio of about five times has been disclosed in Japanese Patent Application Laid-open Publication Nos. 2006-208889 and 2008-180901. Moreover, a zoom lens system having a zooming ratio of about 2.8 to 3 has been disclosed in Japanese Patent Application Laid-open Publication Nos. 2001-343587 and 2004-117828.

SUMMARY OF THE INVENTION

According to a first aspect of the present invention, there is provided a zoom lens system comprising, in order from an object side to an image side a first lens unit having a negative refracting power,
a second lens unit having a positive refracting power,
a third lens unit having a negative refracting power, and
a fourth lens unit having a positive refracting power, and
at the time of zooming from a wide angle end to a telephoto end, distances between the lens units change by at least the first lens unit, the second lens unit, and the third lens unit being moved, and the second lens unit comprises in order from the object side, a first sub-unit having a positive refracting power, a second sub-unit having a negative refracting power, and a third sub-unit having a positive refracting power, and a surface on the object side and a surface on the image side of each of the first sub-unit, the second sub-unit, and the third sub-unit are in contact with air, and the second lens unit does not include other sub-units, and satisfies the following conditional expression (1)

$$3.2 < (\beta_{2t}/\beta_{2w})/(\beta_{3t}/(\beta_{3w}) < 7 \quad (1)$$

where, $\beta_{2t}$ denotes a lateral magnification at the telephoto end of the second lens unit, $\beta_{2w}$ denotes a lateral magnification at the wide angle end of the second lens unit, $\beta_{3t}$ denotes a lateral magnification at the telephoto end of the third lens unit, and $\beta_{3w}$ denotes a lateral magnification at the wide angle end of the third lens unit.

Moreover, according to a second aspect of the present invention, there is provided an image pickup apparatus comprising a zoom lens system, an image pickup element which has an image pickup surface which is disposed on an image side of the zoom lens system, and which converts an image on the image pickup surface formed by the zoom lens system to an electric image, and an image converting section which converts an electric signal including a distortion due to the zoom lens system, into an image signal in which, the distortion is corrected by image processing, and the zoom lens system is a zoom lens system according to the first aspect of the present invention.

BRIEF DESCRIPTION OF THE DRAWINGS

FIG. 1A shows a state at a wide angle end, FIG. 1B shows an intermediate state, and FIG. 1C shows a state at a telephoto end;

FIG. 5A shows a state at a wide angle end, FIG. 5B shows an intermediate state, and FIG. 5C shows a state at a telephoto end;

DETAILED DESCRIPTION OF THE PREFERRED EMBODIMENTS

Figure 1A:
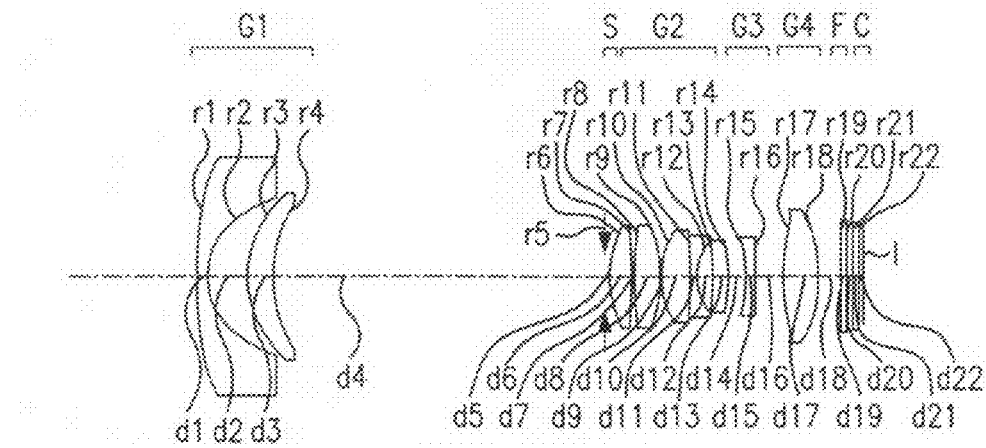
FIG. 1A, FIG. 1B, and FIG. 1C are cross-sectional views along an optical axis showing an optical arrangement at a time of infinite object point focusing according to a first embodiment of a zoom lens system of the present invention, where.

A zoom lens system of the present invention includes in order from an object side to an image side a first lens unit having a negative refracting power,
a second lens unit having a positive refracting power,
a third lens unit having a negative refracting power, and
a fourth lens unit having a positive refracting power, and
at the time of zooming from a wide angle end to a telephoto end, distances between the lens units change by at least the first lens unit, the second lens unit, and the third lens unit being moved, and the second lens unit includes in order from the object side, a first sub-unit having a positive refracting power, a second sub-unit having a negative refracting power, and a third sub-unit having a positive refracting power, and a surface on the object side and a surface on the image side of each of the first sub-unit, the second sub-unit, and the third sub-unit are in contact with air, and satisfy the following conditional expression (1)

$$3.2 < (\beta_{2t}/\beta_{2w})/(\beta_{3t}/\beta_{3w}) < 7 \qquad (1)$$

where, $\beta_{2t}$ denotes a lateral magnification at the telephoto end of the second lens unit, $\beta_{2w}$ denotes a lateral magnification at the wide angle end of the second lens unit, $\beta_{3t}$ denotes a lateral magnification at the telephoto end of the third lens unit, and $\beta_{3w}$ denotes a lateral magnification at the wide angle end of the third lens unit.

By making such an arrangement, the lens unit arrangement becomes such that it is easy to carry out small sizing while having a wide angle of field, and a high zooming ratio. The second lens unit and the third lens unit bear a zooming function from the wide angle end to the telephoto end, and it is advantageous for securing the zooming ratio and adjusting an aberration balance.

Moreover, a variation in an image plane position with the zooming is adjusted by making the first lens unit movable. By changing a distance between the two lens units by disposing the third lens unit having a negative refracting power and the fourth lens unit having a positive refracting power, it is possible to make bear an effect of zooming, a reduction in variation of an exist pupil at the wide angle end and the telephoto end, and a correction of a curvature of field.

In a zoom lens system of a negative-lead type, when a focal length at the telephoto end is increased with an increase in the zooming ratio, and simultaneously an F-number is secured, an entrance pupil diameter becomes substantial, and it becomes difficult to suppress an occurrence of a spherical aberration and a coma aberration in the second lens unit in particular.

To solve this, in the present invention, an arrangement of the second lens unit is such that sub units having a positive, negative, and positive refracting power are disposed in order from the object side, and the surface on the object side and the surface on the image side of each sub unit makes a contact with air. Therefore, it is advantageous for correction of various aberrations including a spherical aberration by a power arrangement of a triplet type. Moreover, since it is possible to make small a distance between principal points, it is advantageous for small sizing of the second lens unit.

Conditional expression (1) is an expression in which, a preferable ratio of a change in lateral magnification at the wide angle end and the telephoto end of the second lens unit and the third lens unit is specified.

By making an arrangement such that a lower limit in the conditional expression (1) is not surpassed, a zooming load of the third lens unit is prevented from becoming excessively strong, and it is advantageous for achieving both, the small sizing of the third lens unit and reduction in various aberrations.

By making an arrangement such that an upper limit in the conditional expression (1) is not surpassed, a zooming load of the second lens unit is prevented from becoming excessively strong, and it is advantageous for achieving both, the small sizing of the second lens unit and reduction in various aberrations.

In the zoom lens system having the first lens unit having a negative refracting power, the second lens unit having a positive refracting power, the third lens unit having a negative refracting power, and the fourth lens unit having a positive refracting power, by making the arrangement of the second lens unit by disposing in order from the object side three sub units having the positive, negative, and positive refracting power, the arrangement is let to be advantageous for the size reduction and the correction of various aberrations, and the conditional expression (1) is satisfied. Accordingly, the zooming load is appropriate upon achieving high zooming ratio, and it becomes easy to reduce an amount of movement and an absolute value of refracting power of each lens unit, and therefore it is preferable.

The zoom lens system of the present invention is let to have the abovementioned structure as a basic structure. Furthermore, it is preferable that one or a plurality of the following items is satisfied simultaneously.

Moreover, when the zoom lens system has a focusing function, each invention is let to have an arrangement in a state of focused to the farthest object.

Moreover, it is preferable that the second lens unit satisfies the following conditional expression (2).

$$0.2 < f_2/f_t < 0.7 \qquad (2)$$

where, $f_2$ denotes a focal length of the second lens unit, and $f_t$ denotes a focal length of the entire zoom lens system at the telephoto end.

The conditional expression (2) is an expression which specifies a preferable refracting power of the second lens unit.

By making an arrangement such that a lower limit in the conditional expression (2) is not surpassed, it is easy to carry out the correction of the spherical aberration and the coma aberration which occurs in the second lens unit.

By making an arrangement such that an upper limit in the conditional expression (2) is not surpassed, it is possible to reduce the amount of movement of the second lens unit, and it becomes advantageous for small sizing including a mechanical mechanism.

Moreover, it is preferable that the second lens unit satisfies the following conditional expression (3).

$$2 < \beta_{2t}/\beta_{2w} < 7 \quad (3)$$

The conditional expression (3) is an expression which specifies a preferable ratio of the lateral magnification at the telephoto end and at the wide angle end of the second lens unit.

By making an arrangement such that a lower limit in the conditional expression (3) is not surpassed, an increase in the zooming load of lens units other than the second lens unit, particularly the third lens unit is suppressed, leading to a reduction in various aberrations which occur in the third lens unit.

By making an arrangement such that an upper limit in the conditional expression (3) is not surpassed, and by suppressing the zooming load of the second lens unit to a moderate degree, it is advantageous for reduction of the amount of movement of the second lens unit, and reduction of the spherical aberration and the coma aberration in the second lens unit.

Moreover, it is preferable that the second lens unit satisfies the following conditional expression (4).

$$1 < mv_{2g}/f_2 < 3.5 \quad (4)$$

where, $mv_{2g}$ denotes a difference of a position at the telephoto end with respect to a position at the wide angle end of the second lens unit, letting a movement toward the object side to have a positive sign, and $f_2$ denotes a focal length of the second lens unit.

The conditional expression (4) is an expression which regulates the preferable amount of movement of the second lens unit.

By making an arrangement such that a lower limit in the conditional expression (4) is not surpassed, it is possible to secure a magnification function by the second lens unit, leading to a high zooming ratio.

By making an arrangement such that an upper limit in the conditional expression (4) is not surpassed, it becomes easy to reduce variation in various aberrations which occur in the second lens unit at the time of zooming.

Moreover, it is preferable that a combined refracting power of the second sub-unit and the third sub-unit is negative.

Accordingly, position of principal points on the object side of the second lens unit moves toward the object side, and it is easy to secure an amount of change in a distance between the first lens unit and the second lens unit, which is advantageous for having the high zooming ratio.

Furthermore, it is preferable that the second sub-unit and the third sub-unit satisfy the following conditional expression (A).

$$-0.7 < f_{22}/f_{23} < -0.25 \quad (A)$$

where, $f_{22}$ denotes a focal length of the second sub-unit in the second lens unit, and $f_{23}$ denotes a focal length of the third sub-unit in the second lens unit.

The conditional expression (A) is an expression which specifies a ratio of a preferable refracting power of the second sub-unit and the third sub-unit.

By securing the negative refracting power of the second sub-unit and by suppressing the positive refracting power of the third sub-unit to a moderate degree by making an arrangement such that a lower limit in the conditional expression (A) is not surpassed, it is easy to make principal points on the object side of the second lens unit to be toward the object side, and it is advantageous for securing the zooming ratio.

By making an arrangement such that an upper limit in the conditional expression (A) is surpassed, it is possible to secure the positive refracting power of the third lens unit and to reduce a load of the positive refracting power on the first sub-unit. Moreover, it is advantageous for suppressing aberrations such as the spherical aberration and the coma aberration due to widening of the angle of field and making the zooming ratio high.

Moreover, it is preferable that the second sub-unit includes one cemented lens component having a negative refracting power. By forming the second sub-unit by a cemented lens having a negative refracting power, it is possible to reduce effectively a chromatic aberration along with various aberrations which occur in the second lens unit.

Furthermore, it is preferable that the cemented lens component which is the second sub-unit has a convex meniscus shape toward the object side, and satisfies the following conditional expression (5).

$$3 < (R_{2f} + R_{2b})/(R_{2f} - R_{2b}) < 10 \quad (5)$$

where, $R_{2f}$ denotes a paraxial radius of curvature of a surface on the object side, of the cemented lens component, and $R_{2b}$ denotes a paraxial radius of curvature of a surface on the image side, of the cemented lens component.

The conditional expression (5) is an expression which specifies a preferable shape of the cemented lens component.

By making an adjustment such that a lower limit in the conditional expression (5) is not surpassed, it becomes easy to suppress the negative refracting power of the second sub-unit, and to secure the positive refracting power of the second lens unit. Moreover, it becomes easy to make the principal points of the second lens unit to be toward the object side, and it is advantageous for making the zooming ratio high.

By making an arrangement such that an upper limit in the conditional expression (5) is not surpassed, it becomes easy to secure the negative refracting power of the second sub-unit, and to secure a function of correcting an aberration which occurs in the first sub-unit and the third sub-unit.

Moreover, it is preferable that the cemented lens component in the second lens unit includes in order from the object side, a biconvex positive lens and a biconcave negative lens, and satisfies the following conditional expression (6).

$$0.1 < N_{2n} - N_{2p} < 0.7 \quad (6)$$

where, $N_{2n}$ denotes a refractive index for a d-line of the biconcave negative lens, and $N_{2p}$ denotes a refractive index for a d-line of the biconvex positive lens.

By letting a surface on the image side of the cemented lens which becomes the second sub-unit to be a concave surface, it becomes easy to cancel an aberration such as a spherical aberration due to a positive lens in the movable positive lens unit, and to make refract off-axis rays in a direction away from an optical axis. Accordingly, it is advantageous for small sizing in a radial direction of the movable positive lens unit.

Whereas, when a refracting power of this concave surface becomes excessively strong, a correction of an oblique aberration of high order becomes difficult. Therefore, it is preferable to form this cemented lens by a biconvex positive lens and a biconcave negative lens. Accordingly, the negative refracting power is borne by two surfaces namely a surface on the object side and a surface on, the image side of the biconcave negative lens, and it is advantageous for reducing the oblique aberration of high order.

The conditional expression (6) is an expression which specifies a preferable difference in the refractive indices of the biconvex positive lens and the biconcave negative lens.

By making an arrangement such that a lower limit in the conditional expression (6) is not surpassed, it is possible to secure a negative refracting power of a cemented surface, and it is advantageous for correction of the oblique aberration of high order.

By making an arrangement such that an upper limit in the conditional expression (6) is not surpassed, it is possible to secure a positive refracting power to a moderate degree by securing the refractive index of the biconvex positive lens, and it is advantageous for securing the positive refracting power of the second lens unit.

Moreover, it is preferable that an aperture stop which moves integrally with the second lens unit at the time of zooming from the wide angle end to the telephoto end is disposed between the first lens unit and the third lens unit.

Accordingly, it is advantageous for securing telecentricity, small sizing in the radial direction of the first lens unit, and correction of various aberrations. Moreover, also the mechanical mechanism is simplified.

Furthermore, when the aperture stop is disposed immediately before the second lens unit, it is even more advantageous for securing telecentricity and a small sizing in the radial direction of the first lens unit.

Moreover, it is preferable that the third sub unit is formed by a single lens having a positive refracting power. By letting the third unit to be a single lens, it is possible to reduce a thickness of the overall second lens unit, and it is advantageous for small sizing of the entire zoom lens system.

Moreover, it is preferable that the first sub unit is made by two positive lenses.

The first sub-unit has a function of securing the positive refracting power of the second lens unit, and moving position of principal points on the object side of the second lens unit toward the object side. Therefore, it is preferable to make the refracting power high. At this time, by forming the first sub-unit by two positive lenses, it is advantageous for reducing a longitudinal aberration which occurs in the first sub-unit.

Or, it is preferable that the first sub-unit is made of one positive lens.

This is advantageous for making the thickness of the entire second lens unit small, and for small sizing of the entire zoom lens system.

Moreover, it is preferable that the first lens unit includes in order from the object side, two lens components namely a negative lens component and a positive lens component.

By disposing the negative lens component on the object side, it is possible to move a position of an entrance pupil further toward the object side, and to make small an effective diameter on a wide angle side, and it is advantageous for small sizing in the radial direction of the first lens unit. Moreover, at the same time, it is also advantageous for making small the thickness of the first lens unit.

Moreover, it is preferable that the positive lens component in the first lens unit has an aspheric surface.

When the first lens unit is let to have in order from the object side, the negative lens unit and the positive lens unit, an axial light beam diameter in the positive lens component becomes substantial. Therefore, by using the positive lens component having an aspheric surface, it is advantageous for reducing a longitudinal aberration in this positive lens component.

Moreover, it is preferable that the negative lens component in the first lens unit has a surface on the object side which is an aspheric surface having a concave surface at a center and a convex surface at a periphery, and that the positive lens component in the first lens unit has a convex meniscus shape on the object side.

Accordingly, it is possible to correct favorably the longitudinal aberration and the oblique aberration in the two lens components. Moreover, it is advantageous for slimming in a direction of thickness of the first lens unit.

In other words, since a central portion of the negative lens component becomes a biconcave shape, by dividing the negative refracting power, it is advantageous for correction of the spherical aberration at the telephoto end in particular. Moreover, it is possible to make small an angle of incidence and an angle of emergence of off-axis light beam to each lens component at the wide angle end. Therefore, it is advantageous for reducing excessive distortion.

Moreover, it is preferable that the number of lens components in the second lens unit is three or four.

Accordingly, it is advantageous for achieving both, the slimming of the second lens unit and securing an aberration-correcting function.

Furthermore, it is preferable that the number of lenses in the second lens unit is four or five.

By reducing the total number of lenses, it becomes advantageous for achieving both, the small sizing and securing the performance.

Moreover, it is preferable that the third lens unit satisfies the following conditional expression (7).

$$1 < \beta_{3t}/\beta_{3w} < 2.5 \quad (7)$$

where, $\beta_{3t}$ denotes a lateral magnification at the telephoto end of the third lens unit, and $\beta_{3w}$ denotes a lateral magnification at the wide angle end of the third lens unit.

The conditional expression (7) is an expression which specifies a preferable ratio of lateral magnification at the telephoto end and at the wide angle end of the third lens unit.

By making an arrangement such that a lower limit in the conditional expression (7) is not surpassed, it becomes easy to suppress a zooming load of the lens units other than the third lens unit, particularly of the second lens unit, and it is advantageous for reducing various aberrations in the second lens unit.

By making an arrangement such that an upper limit in the conditional expression (7) is not surpassed, the zooming load of the third lens unit is suppressed, and it is advantageous for reducing an amount of movement of the third lens unit, and reducing the spherical aberration and the coma aberration in the third lens unit.

Moreover, it is preferable that the second lens unit and the third lens unit are positioned toward the object side at the telephoto end than a position at the wide angle end, and a distance between the second lens unit and the third lens unit widens at the telephoto end than at the wide angle end.

Accordingly, it becomes easy to secure a zooming effect of both the second lens unit and the third lens unit. Moreover, by suppressing the amount of movement of the third lens unit to a moderate degree, it becomes easy to suppress an effective diameter of the lens unit on the image side of the third lens unit, and it is advantageous for small sizing and correction of various off-axis aberrations, and for securing the telecentricity.

Furthermore, it is preferable that the third lens unit satisfies the following conditional expression (8).

$$1.2 < mv_{2g}/mv_{3g} < 5 \qquad (8)$$

where, $mv_{2g}$ denotes a difference of a position at the telephoto end with respect to a position at the wide angle end of the second lens unit, letting a movement toward the object side to have a positive sign, and $mv_{3g}$ denotes a difference of a position at the telephoto end with respect to a position at the wide angle end of the third lens unit, letting a movement toward the object side to have a positive sign.

The conditional expression (8) is an expression which specifies a preferable ratio of the amount of movement of the second lens unit and the amount of movement of the third lens unit.

By making an arrangement such that a lower limit in the conditional expression (8) is not surpassed, and suppressing the amount of movement of the third lens unit to a moderate degree, it is possible to make small an effective diameter of the lens unit on the image side of the third lens unit and it is advantageous for small sizing and securing an image quality at the telephoto end.

By making an arrangement such that an upper limit in the conditional expression (8) is not surpassed, and securing the amount of movement of the third lens unit, it is possible to reduce the zooming load on the second lens unit, and it is advantageous for securing an optical performance, and securing a zooming ratio.

Moreover, it is preferable that the third lens unit has one negative lens component.

Accordingly, it is possible to make small a thickness of the third lens unit, and it is also advantageous for small sizing of the entire zoom lens system.

Furthermore, it is preferable that the negative lens component is made of a single lens having a negative refracting power, and the single lens having the negative refracting power satisfies the following conditional expression (9).

$$v_{3GP} > 35 \qquad (9)$$

where, $v_{3GP}$ denotes Abbe's number for the negative single lens which forms the third lens unit.

The conditional expression (3) is an expression which specifies a favorable Abbe's number for the single lens having the negative refracting power which forms the third lens unit.

By making an arrangement such that a lower limit in the conditional expression (9) is not surpassed, it is advantageous for reducing a variation in the chromatic aberration due to the third lens unit at the time of zooming.

Moreover, it is preferable that the fourth lens unit is a lens unit which is disposed nearest to the image side, among all the lens units in the zoom lens system, and the fourth lens unit is made of one lens component, and the fourth lens unit moves at the time of focusing and zooming from the wide angle end to the telephoto end.

By moving the fourth lens unit, it is advantageous for an aberration correction at the time of zooming, and an adjustment of the position of the exit pupil. Moreover, by forming the fourth lens unit of one lens component, and letting the fourth lens unit to be a focusing unit, it possible to simplify also a mechanical structure while suppressing a magnification change at the time of focusing.

It is also possible to let the third lens unit to be the focusing unit, but since focus sensitivity is susceptible to become substantial, a precision of a driving mechanism is sought.

Moreover, it is preferable that the zoom lens system satisfies the following conditional expression (10).

$$3.0 < f_t/f_w < 10 \qquad (10)$$

where, $f_w$ denotes a focal length of the entire zoom lens system at the wide angle, and $f_t$ denotes a focal length of the entire zoom lens system at the telephoto end.

The conditional expression (10) is an expression which satisfies a preferable zooming ratio of the zoom lens system.

By making an arrangement such that a lower limit in the conditional expression (10) is not surpassed, the zoom lens becomes capable of dealing with various photography scenes.

By making an arrangement such that an upper limit in the conditional expression (10) is not surpassed, it becomes easy to suppress an increase in the amount of movement of each lens unit, and it is advantageous for slimming of the entire zoom lens system.

Moreover, an image pickup apparatus of the present invention includes a zoom lens system, an image pickup element which has an image pickup surface which is disposed on an image side of the zoom lens system, and which converts an image on the image pickup surface formed by the zoom lens system to an electric signal, and an image converting section which converts an electric signal including a distortion due to the zoom lens system, into an image signal in which, the distortion is corrected by image processing, and the zoom lens system is a zoom lens system according to one of the aspects described above.

Although the distortion and the astigmatism are susceptible to have a trade-off relationship, by having the abovementioned image converting section, it is possible to tolerate distortion of the zoom lens system. Therefore, it is advantageous for reducing astigmatism due to the zoom lens system, and small sizing.

Furthermore, when the distortion correction is carried out for each color signal, it is possible to correct electrically the chromatic aberration of magnification. Correction of obliquely incident light, correction of blurring, and correction of various aberrations may be carried out according to an image processing.

Moreover, it is preferable that a plurality of the abovementioned inventions is satisfied arbitrarily at the same time.

Furthermore, regarding each conditional expression, it is preferable that that function is assured by making further the following arrangements.

It is preferable to let the lower limit value in the conditional expression (1) to be 3.3, and more preferably to be 3.4.

It is preferable to let the upper limit value in the conditional expression (1) to be 6, and more preferably to be 5.5.

It is preferable to let the lower limit value in the conditional expression (2) to be 0.25, and more preferably to be 0.3.

It is preferable to let the upper limit value in the conditional expression (2) to be 0.6, and more preferably to be 0.5.

It is preferable to let the lower limit value in the conditional expression (3) to be 2.5, and more preferably to be 3.

It is preferable to let the upper limit value in the conditional expression (3) to be 6.5, and more preferably to be 6.

It is preferable to let the lower limit value in the conditional expression (4) to be 1.2, and more preferably to be 1.4.

It is preferable to let the upper limit value in the conditional expression (4) to be 3, and more preferably to be 2.7.

It is preferable to let the lower limit value in the conditional expression (5) to be 2.5, and more preferably to be 3.

It is preferable to let the upper limit value in the conditional expression (5) to be 8.5, and more preferably to be 7.

It is preferable to let the lower limit value in the conditional expression (6) to be 0.12, and more preferably to be 0.14.

It is preferable to let the upper limit value in the conditional expression (6) to be 0.5, and more preferably to be 0.4.

It is preferable to let the lower limit value in the conditional expression (7) to be 1.1, and more preferably to be 1.15.

It is preferable to let the upper limit value in the conditional expression (7) to be 2.7, and more preferably to be 2.5.

It is preferable to let the lower limit value in the conditional expression (8) to be 1.4, and more preferably to be 1.6.

It is preferable to let the upper limit value in the conditional expression (8) to be 3.5, and more preferably to be 2.5.

It is preferable to let the lower limit value in the conditional expression (9) to be 45, and more preferably to be 55.

Taking into consideration an ease of procuring the materials, it is preferable to provide the upper limit value 100 in the conditional expression (9), and to make an arrangement such that this upper limit value is not surpassed.

It is preferable to let the lower limit value in the conditional expression (10) to be 3.7, and more preferably to be 4.6.

It is preferable to let the upper limit value in the conditional expression (10) to be 8.7, and more preferably to be 7.6.

It is preferable to let the lower limit value in the conditional expression (A) to be −0.6, and more preferably to be −0.5.

It is preferable to let the upper limit value in the conditional expression (A) to be −0.30, and more preferably to be −0.35.

Exemplary embodiments of the zoom lens system and the image pickup apparatus according to the present invention will be described below in detail by referring to the accompanying diagrams. However, the present invention is not restricted to the embodiments described below.

According to a zoom lens system in each of embodiments shown below, it is a moderate price zoom lens optical system in which, the small sizing of the camera and achieving of high zooming ratio and wide angle which meet user's demand of widening a photography area than the conventional photography area without impairing portability of the camera are fulfilled simultaneously. Moreover, it is a moderate price zoom lens system which is suitable for slimming when a lens barrel is collapsed, and suitable for an electronic image pickup element such as a CCD and a CMOS in which, an image quality of an image taken is maintained to be favorable.

Embodiments from a first embodiment to a fourth embodiment of the zoom lens system of the present invention will be described below. Lens cross-sectional views of a (state at a) wide angle end (FIG. 1A, FIG. 2A, FIG. 3A, and FIG. 4A), an intermediate state (FIG. 1B, FIG. 2B, FIG. 3B, and FIG. 4B), and a (state at a) telephoto end (FIG. 1C, FIG. 2C, FIG. 3C, and FIG. 4C) of an infinite object point focusing according to the first embodiment to the fourth embodiment are shown in FIG. 1A, FIG. 1B, and FIG. 1C to FIG. 4A, FIG. 4B, to FIG. 4C (hereinafter, 'FIG. 1A to FIG. 4C'). In FIG. 1A to FIG. 4C, G1 denotes a first lens unit, G2 denotes a second lens unit, S denotes an aperture stop, G3 denotes a third lens unit, G4 denotes a fourth lens unit, F denotes a parallel flat plate which forms a low pass filter in which, a wavelength region restricting coating which restricts infrared light is applied, C denotes a parallel flat plate of carbon glass of an electronic image pickup element, and I denotes an image plane. A multilayered film for restricting a wavelength region may be applied to a surface of the carbon glass C. Moreover, the carbon glass C may be let to have a low pass filter effect.

Moreover, in each of the embodiments, the aperture stop S moves integrally with the second lens unit G2. Numerical data of each embodiment is data in a state in which, an object at an infinite (object point) is focused. A unit of length of each value is mm, and a unit of angle is degrees)(°). Focusing in each embodiment is carried out by moving the lens unit which is nearest to the image side. Furthermore, zoom data are values at the wide angle end (WE), the intermediate zoom state (ST), and the telephoto end (TE).

Figure 1B:
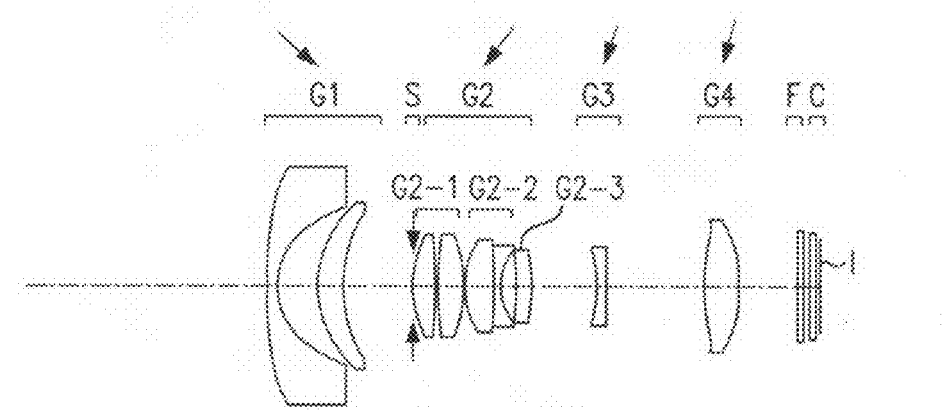
Figure 1C:
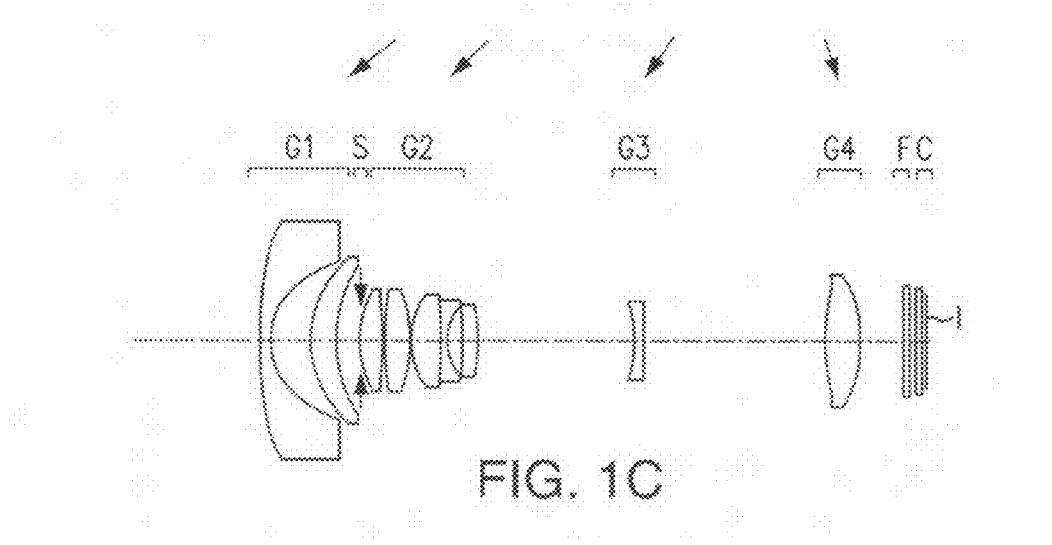

A zoom lens system in the first embodiment, as shown in FIG. 1A, FIG. 1B, and FIG. 1C, includes in order from an object side, a first lens unit G1 having a negative refracting power, an aperture stop S, a second lens unit G2 having a positive refracting power, a third lens unit G3 having a negative refracting power, and a fourth lens unit G4 having a positive refracting power. The second lens unit G2, as shown in FIG. 1B, includes, in order from an object side, a first sub-unit G2-1 having a positive refracting power, a second sub-unit G2-2 having a negative refracting power, and a third sub-unit G2-3 having a positive refracting power.

At the time of zooming from the wide angle end to the telephoto end, the first lens unit G1, after moving toward the image side, moves toward the object side. The second lens unit G2 moves toward the object side. The third lens unit G3 moves toward the object side. The fourth lens unit G4, after moving toward the object side, moves toward the image side.

In order from the object side, the first lens unit G1 includes a biconcave negative lens and a positive meniscus lens having a convex surface directed toward the object side. The second lens unit G2 includes a biconvex positive lens, a biconvex positive lens, a cemented lens of a biconvex positive lens and a biconcave negative lens, and a positive meniscus lens having a convex surface directed toward the image side. The third lens unit G3 includes a biconcave negative lens. The fourth lens unit G4 includes a biconvex positive lens.

An aspheric surface is provided to eight surfaces namely, both surfaces of the biconcave negative lens in the first lens unit G1, both surfaces of the positive meniscus lens having the convex surface directed toward the object side, both surfaces of the biconvex positive lens nearest to the object side, in the second lens unit G2, and both surfaces of the biconvex positive lens in the fourth lens unit G4.

Figure 2A:
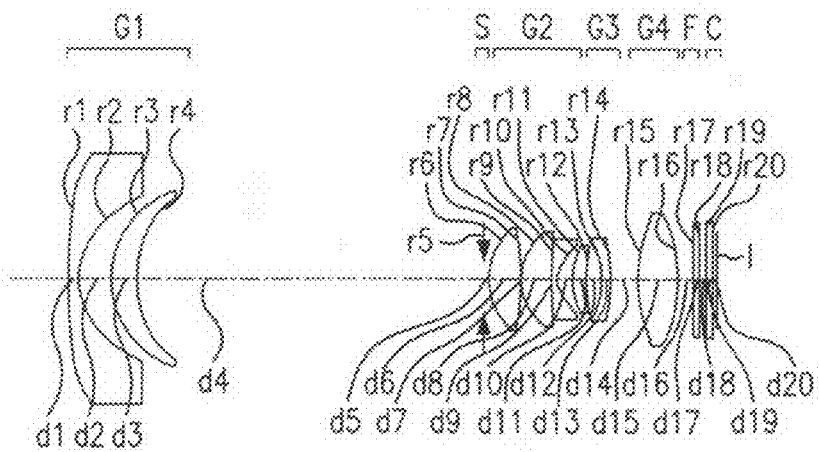
FIG. 2A, FIG. 2B, and FIG. 2C are diagrams similar to FIG. 1A, FIG. 1B, and FIG. 1C respectively, according to a second embodiment of the zoom lens system according to the present invention.
Figure 2B:
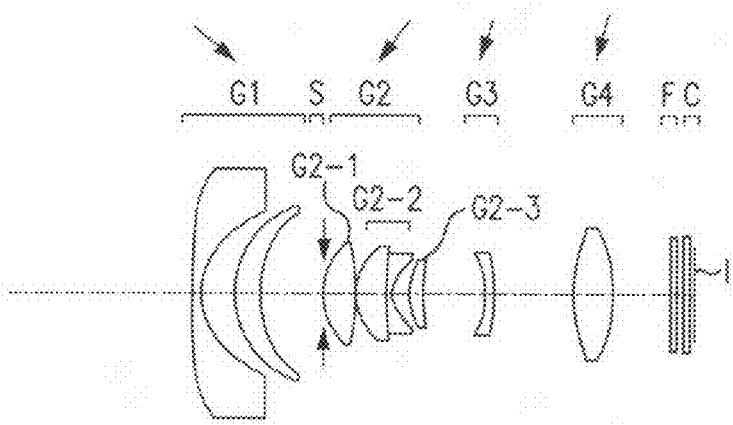
Figure 2C:
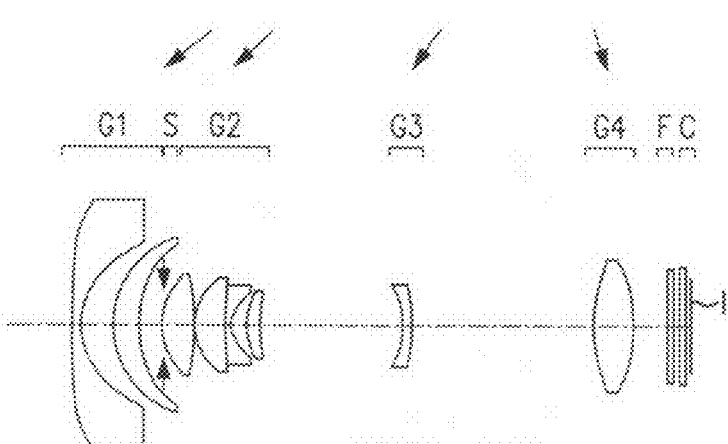

A zoom lens system in the second embodiment, as shown in FIG. 2A, FIG. 2B, and FIG. 2C, includes in order from an object side, a first lens unit G1 having a negative refracting power, an aperture stop S, a second lens unit G2 having a positive refracting power, a third lens unit G3 having a negative refracting power, and a fourth lens unit G4 having a positive refracting power. The second lens unit G2, as shown in FIG. 2B, includes, in order from an object side, a first sub-unit G2-1 having a positive refracting power, a second sub-unit G2-2 having a negative refracting power, and a third sub-unit G2-3 having a positive refracting power.

At the time of zooming from the wide angle end to the telephoto end, the first lens unit G1, after moving toward the image side, moves toward the object side. The second lens unit G2 moves toward the object side. The third lens unit G3 moves toward the object side. The fourth lens unit G4, after moving toward the object side, moves toward the image side.

In order from the object side, the first lens unit G1 includes a biconcave negative lens and a positive meniscus lens having a convex surface directed toward the object side.

The second lens unit G2 includes a biconvex positive lens, a cemented lens of a positive meniscus lens having a convex surface directed toward the object side and a negative meniscus lens having a convex surface directed toward the object side, and a positive meniscus lens having a convex surface directed toward the object side. The third lens unit G3 includes a negative meniscus lens having a convex surface directed toward the image side. The fourth lens unit G4 includes a biconvex positive lens.

An aspheric surface is provided to eight surfaces namely, both surfaces of the biconcave negative lens in the first lens unit G1, both surfaces of the positive meniscus lens having the convex surface directed toward the object side, both surfaces of the biconvex positive lens in the second lens unit G2, and both surfaces of the biconvex positive lens in the fourth lens unit G4.

Figure 3A:
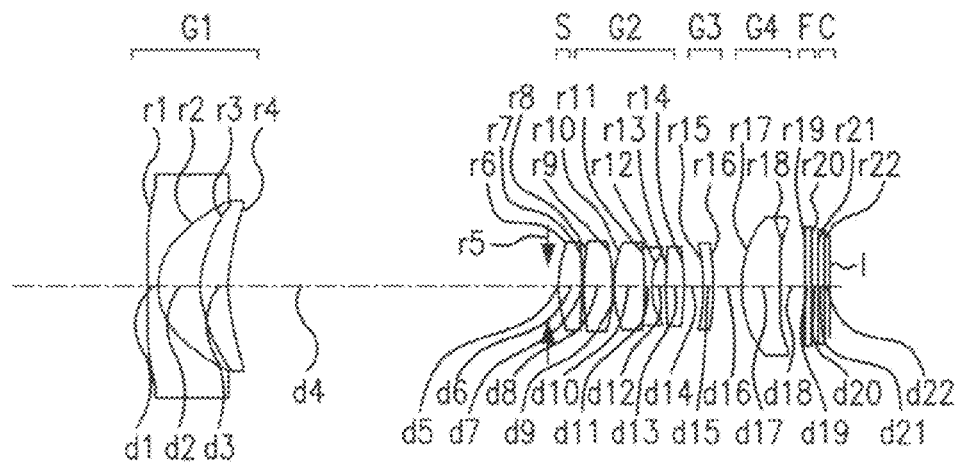
FIG. 3A, FIG. 3B, and FIG. 3C are diagrams similar to FIG. 1A, FIG. 1B, and FIG. 1C respectively, according to a third embodiment of the zoom lens system of the present invention.
Figure 3B:
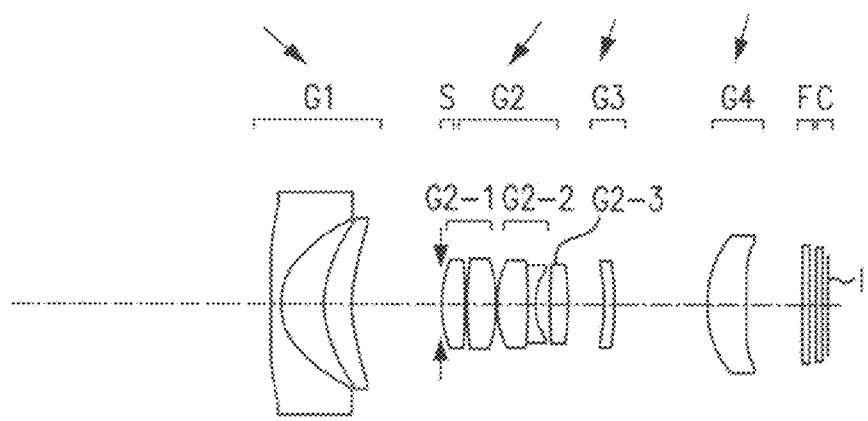
Figure 3C:
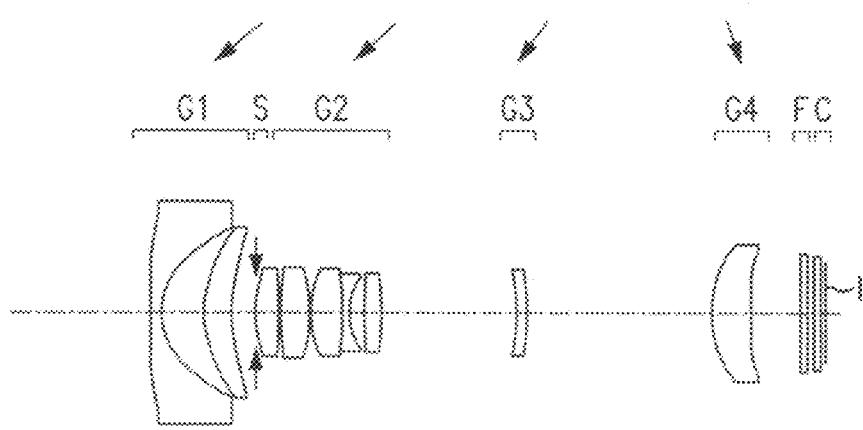

A zoom lens system in the third embodiment, as shown in FIG. 3A, FIG. 3B, and FIG. 3C, includes in order from an object side, a first lens unit G1 having a negative refracting power, an aperture stop S, a second lens unit G2 having a positive refracting power, a third lens unit G3 having a negative refracting power, and a fourth lens unit G4 having a positive refracting power. The second lens unit G2, as shown in FIG. 3B, includes, in order from an object side, a first sub-unit G2-1 having a positive refracting power, a second sub-unit G2-2 having a negative refracting power, and a third sub-unit G2-3 having a positive refracting power.

At the time of zooming from the wide angle end to the telephoto end, the first lens unit G1, after moving toward the image side, moves toward the object side. The second lens unit G2 moves toward the object side. The third lens unit G3 moves toward the object side. The fourth lens unit G4, after moving toward the object side, moves toward the image side.

In order from the object side, the first lens unit G1 includes a biconcave negative lens and a positive meniscus lens having a convex surfaces directed toward the object side.

The second lens unit G2 includes a biconvex positive lens, a biconvex positive lens, a cemented lens of a biconvex positive lens and a biconcave negative lens, and a biconvex positive lens. The third lens unit G3 includes a negative meniscus lens having a convex surface directed toward the image side. The fourth lens unit G4 includes a positive meniscus lens having a convex surface directed toward the object side.

An aspheric surface is provided to eight surfaces namely, both surfaces of the biconcave negative lens in the first lens unit G1, both surfaces of the positive meniscus lens having the convex surface directed toward the object side, both surfaces of the biconvex positive lens nearest to the object side in the second lens unit G2, and both surfaces of the positive meniscus lens having the convex surface directed toward the object side in the fourth lens unit G4.

Figure 4A:
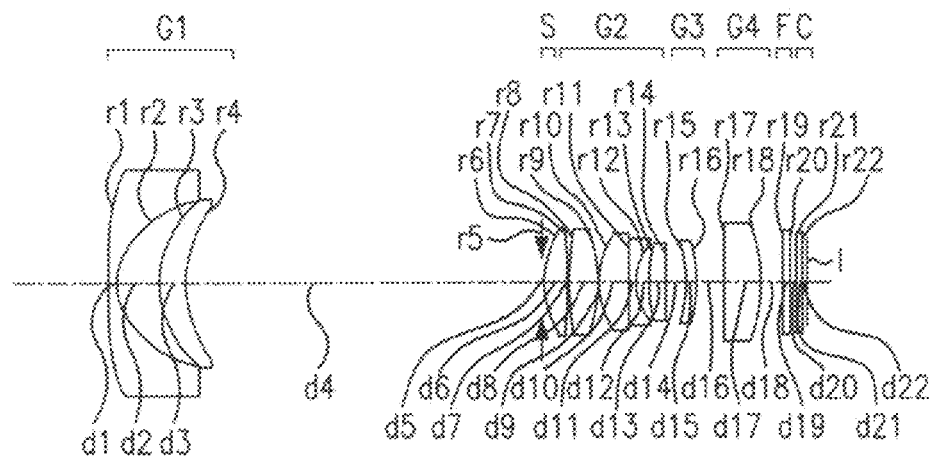
FIG. 4A, FIG. 4B, and FIG. 4C are diagrams similar to FIG. 1A, FIG. 1B, and FIG. 1C respectively, according to a fourth embodiment of the zoom lens system of the present invention.
Figure 4B:
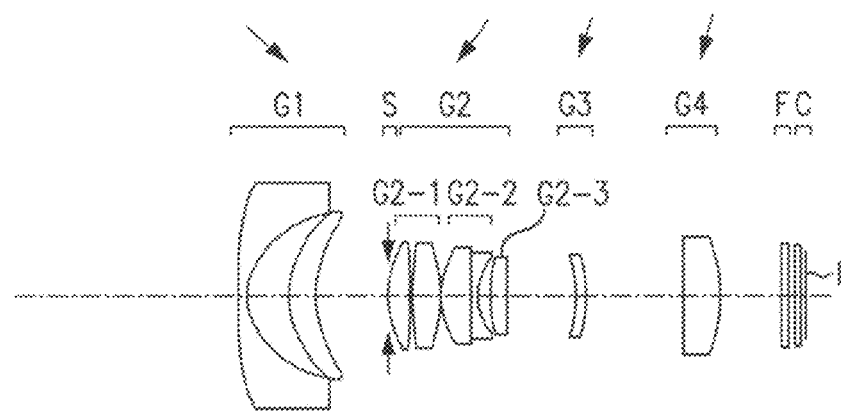
Figure 4C:
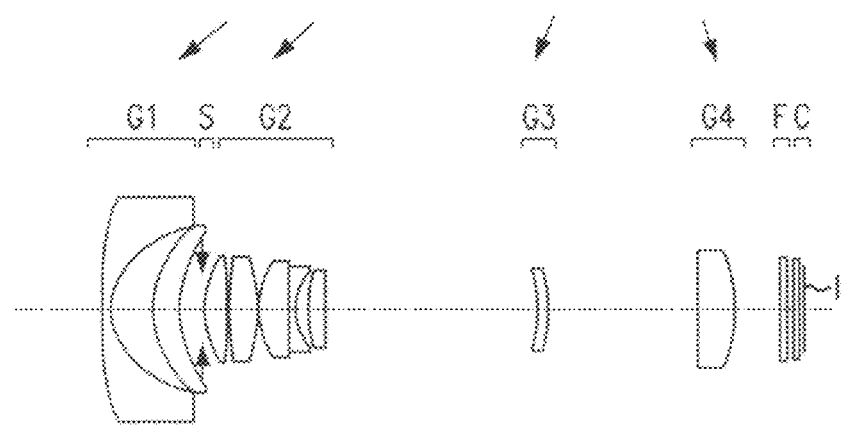
Figure 5A:
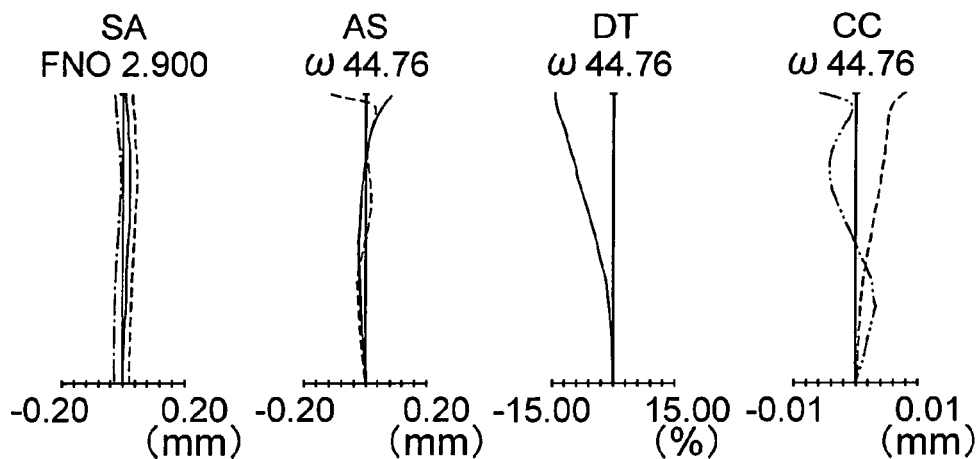
FIG. 5A, FIG. 5B, and FIG. 5C are diagrams showing a spherical aberration, an astigmatism, a distortion, and a chromatic aberration of magnification at the time of infinite object point focusing of the first embodiment, where.
Figure 5B:
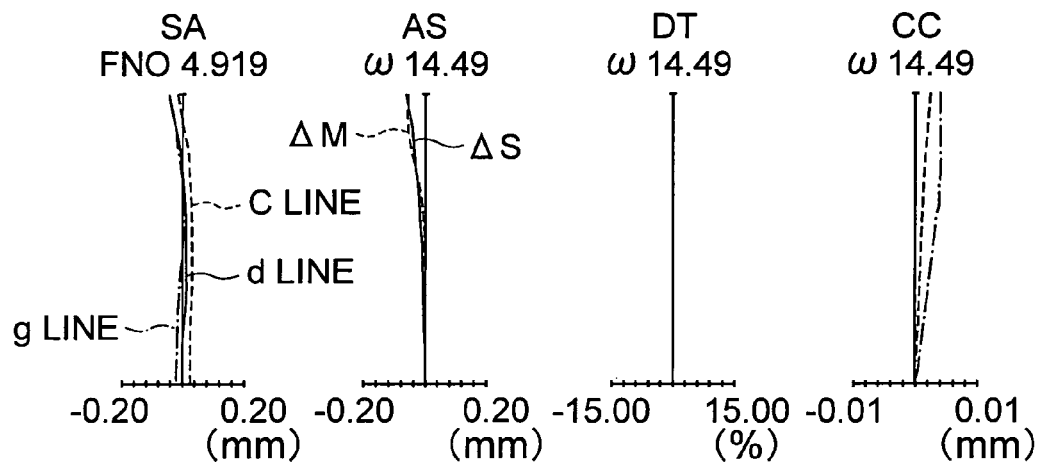
Figure 5C:
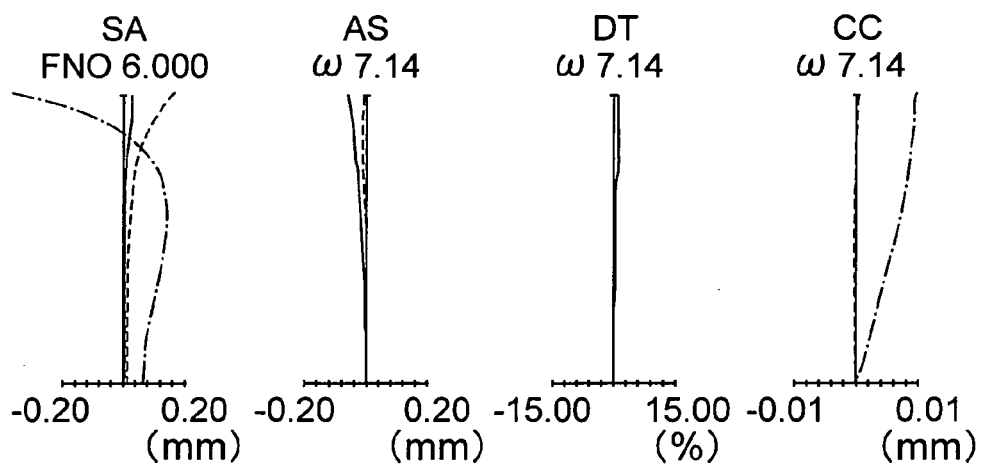
Figure 6A:
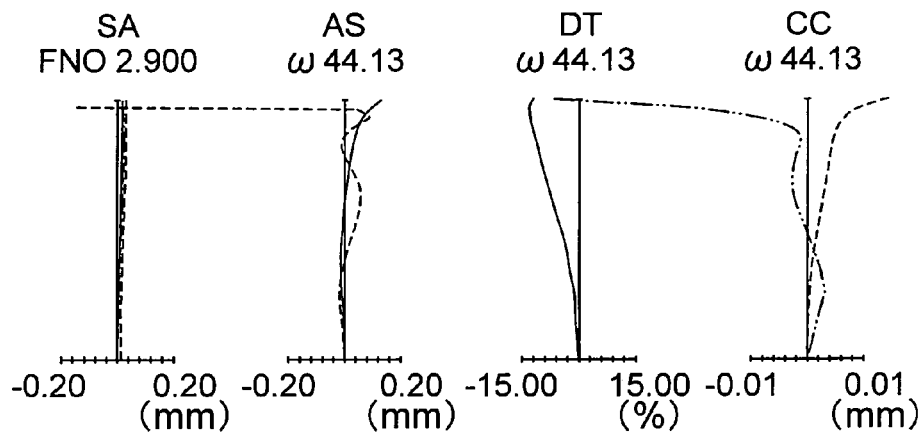
FIG. 6A, FIG. 6B, and FIG. 6C are diagrams similar to FIG. 5A, FIG. 5B, and FIG. 5C at the time of infinite object point focusing of the second embodiment.
Figure 6B:
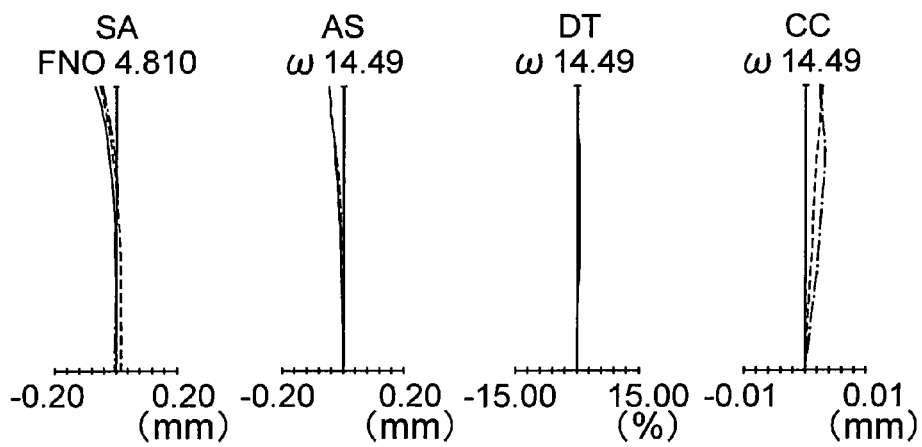
Figure 6C:
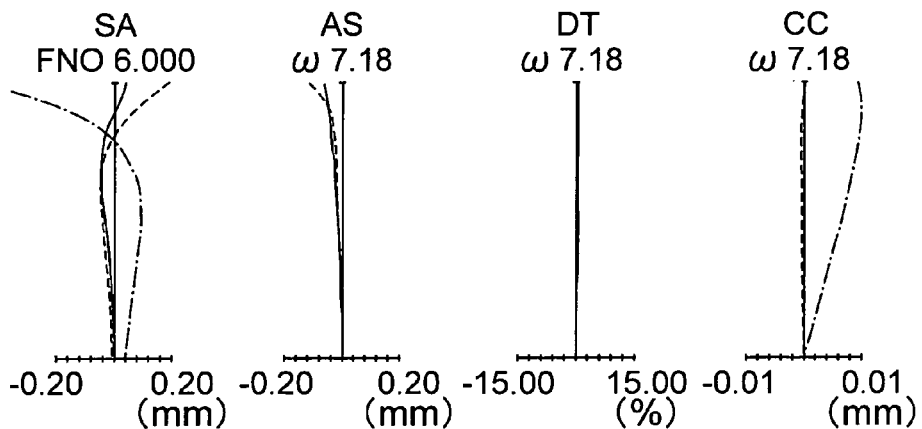
Figure 7A:
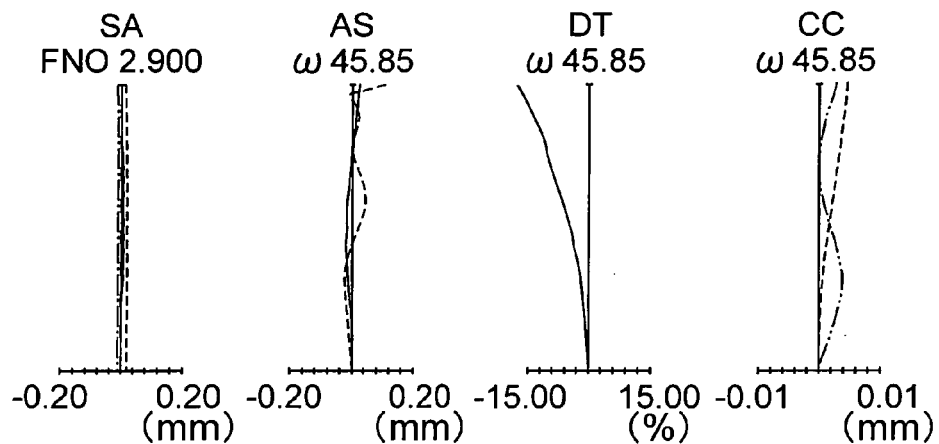
FIG. 7A, FIG. 7B, and FIG. 7C are diagrams similar to FIG. 5A, FIG. 5B, and FIG. 5C at the time of infinite object point focusing of the third embodiment.
Figure 7B:
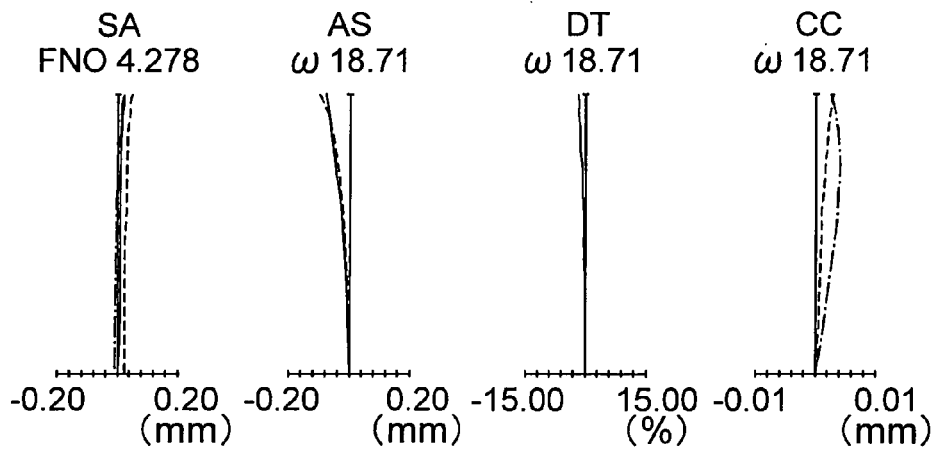
Figure 7C:
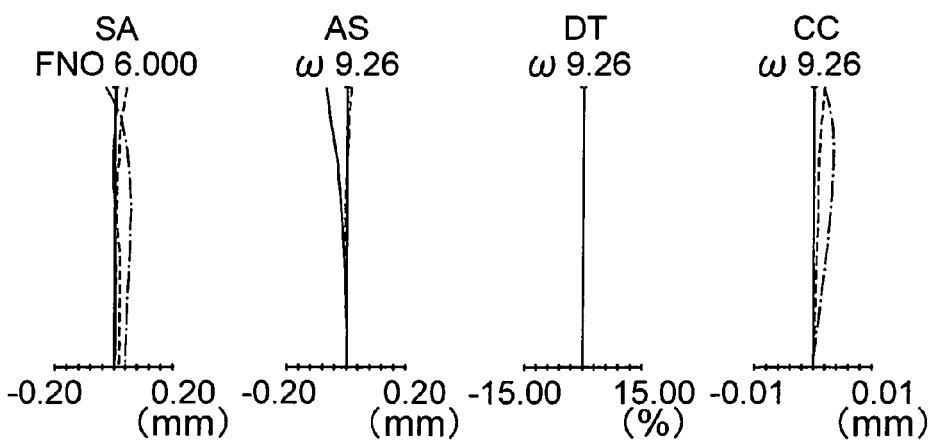
Figure 8A:
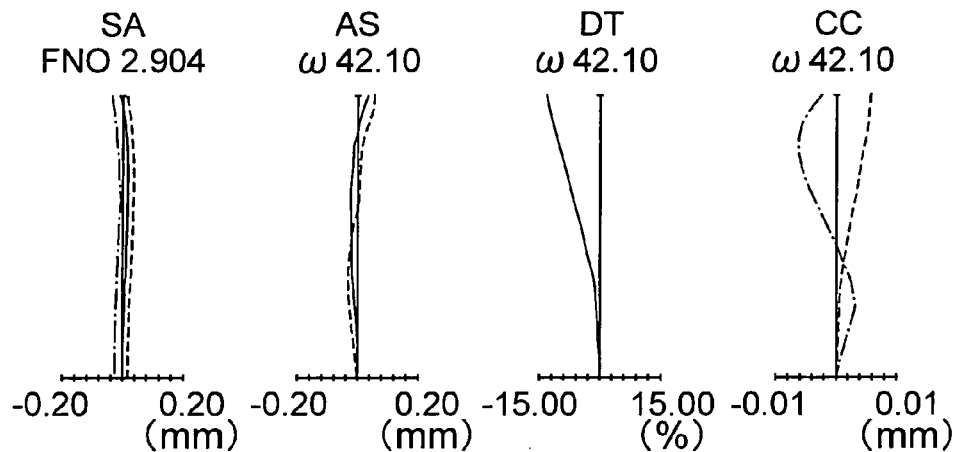
FIG. 8A, FIG. 8B, and FIG. 8C are diagrams similar to FIG. 5A, FIG. 5B, and FIG. 5C at the time of infinite object point focusing of the fourth embodiment.
Figure 8B:
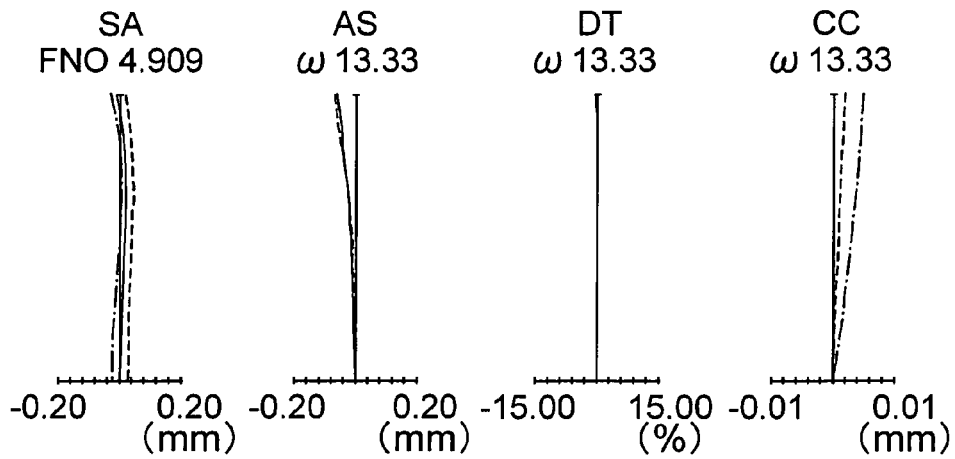
Figure 8C:
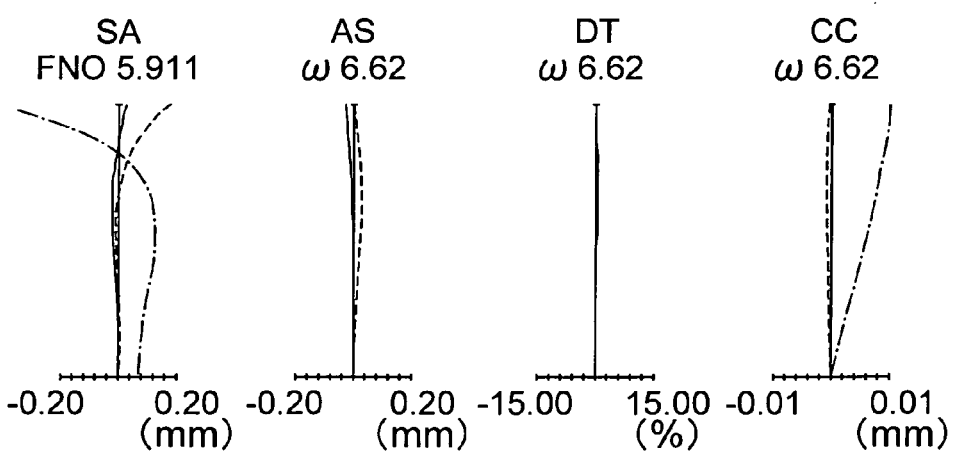

A zoom lens system in the fourth embodiment, as shown in FIG. 4A, FIG. 4B, and FIG. 4C, includes in order from an object side, a first lens unit G1 having a negative refracting power, an aperture stop S, a second lens unit G2 having a positive refracting power, a third lens unit G3 having a negative refracting power, and a fourth lens unit G4 having a positive refracting power. The second lens unit G2, as shown in FIG. 4B, includes, in order from an object side, a first sub-unit G2-1 having a positive refracting power, a second sub-unit G2-2 having a negative refracting power, and a third sub-unit G2-3 having a positive refracting power.

At the time of zooming from the wide angle end to the telephoto end, the first lens unit G1, after moving toward the image side, moves toward the object side. The second lens unit G2 moves toward the object side. The third lens unit G3 moves toward the object side. The fourth lens unit G4, after moving toward the object side, moves toward the image side.

In order from the object side, the first lens unit G1 includes a biconcave negative lens and a positive meniscus lens having a convex surface directed toward the object side. The second lens unit G2 includes a biconvex positive lens, a biconvex positive lens, a cemented lens of a biconvex positive lens and a biconcave negative lens, and a positive meniscus lens having a convex surface directed toward the object side. The third lens unit G3 includes a negative meniscus lens having a convex surface directed toward the image side. The fourth lens unit G4 includes a biconvex positive lens.

An aspheric surface is provided to eight surfaces namely, both surfaces of the biconcave negative lens in the first lens unit G1, both surfaces of the positive meniscus lens having the convex surface directed toward the object side, both surfaces of the biconvex positive lens nearest to the object side, in the second lens unit G2, and both surfaces of the biconvex positive lens in the fourth lens unit G4.

Numerical data of each embodiment described above is shown below. Apart from symbols described above, f denotes a focal length of the entire zoom lens system, $F_{NO}$ denotes an F number, ω denotes a half angle of field, WE denotes a wide angle end, ST denotes an intermediate state, TE denotes a telephoto end, each of r1, r2, . . . denotes radius of curvature of each lens surface, each of d1, d2, . . . denotes a distance between two lenses, each of nd1, nd2, . . . denotes a refractive index of each lens for a d-line, and each of vd1, vd2, . . . denotes an Abbe's number for each lens.

The overall length of the lens system which will be described later is a length which is obtained by adding the back focus to a distance from the first lens surface up to the last lens surface. BF (back focus) is a unit which is expressed upon air conversion of a distance from the last lens surface up to a paraxial image plane.

When x is let to be an optical axis with a direction of traveling of light as a positive (direction), and y is let to be in a direction orthogonal to the optical axis, a shape of the aspheric surface is described by the following expression.

$$x=(y^2/r)/[1+\{1-(K+1)(y/r)^2\}^{1/2}]+A_4y^4+A_6y^6+A_8y^8+A_{10}y^{10}+A_{12}y^{12}$$

where, r denotes a paraxial radius of curvature, K denotes a conical coefficient, A4, A6, A8, A10, and $A_{12}$ denote aspherical surface coefficients of a fourth order, a sixth order, an eight order, a tenth order, and a twelfth order respectively. Moreover, in the aspherical surface coefficients, 'e-n' (where, n is an integral number) indicates '$10^{-n}$'.

EXAMPLE 1

| | unit mm | | | |
|---|---|---|---|---|
| | Surface data | | | |
| Surface no. | r | d | nd | vd |
| object plane | ∞ | ∞ | | |
| 1* | −86.803 | 0.69 | 1.76802 | 49.24 |
| 2* | 7.298 | 3.10 | | |
| 3* | 8.646 | 2.00 | 2.00179 | 19.31 |
| 4* | 10.745 | Variable | | |
| 5 (S) | ∞ | 0.00 | | |
| 6 | 9.134 | 1.80 | 1.51633 | 64.14 |
| 7* | −100.000 | 0.05 | | |
| 8 | 29.474 | 2.17 | 1.49700 | 81.54 |
| 9 | −15.791 | 0.05 | | |
| 10 | 8.353 | 2.29 | 1.85135 | 40.10 |

-continued

| unit mm | | | | |
|---|---|---|---|---|
| 11 | −83.213 | 0.50 | 2.00330 | 28.27 |
| 12 | 5.290 | 1.10 | | |
| 13 | −253.210 | 1.30 | 1.49700 | 81.54 |
| 14 | −17.719 | Variable | | |
| 15 | −11.458 | 0.74 | 1.49700 | 81.54 |
| 16 | 111.808 | Variable | | |
| 17* | 18.823 | 2.80 | 1.63854 | 55.38 |
| 18* | −16.695 | Variable | | |
| 19 | ∞ | 0.50 | 1.53996 | 59.45 |
| 20 | ∞ | 0.50 | | |
| 21 | ∞ | 0.49 | 1.51633 | 64.14 |
| 22 | ∞ | 0.36 | | |
| Image plane (Light receiving surface) | ∞ | | | |

Aspherical surface data

1st surface $k = 0.000$
$A4 = 4.87289e-04, A6 = -5.00851e-06, A8 = 2.00000e-08$

2nd surface $k = 0.000$
$A4 = -5.45180e-06, A6 = 1.16965e-05, A8 = -8.44512e-08,$
$A10 = -1.88012e-09$ 3rd surface $k = 0.000$
$A4 = -5.92470e-04, A6 = 4.38677e-06, A8 = 1.33432e-10$ 4th surface $k = 0.000$
$A4 = -5.24331e-04, A6 = 5.02508e-06$ 6th surface $k = 0.000$
$A4 = -4.17350e-04, A6 = -5.33984e-07, A8 = -4.56526e-07$ 7th surface $k = 0.000$
$A4 = -2.48178e-05, A6 = -1.79353e-06, A8 = -3.90550e-07$ 17th surface $k = 0.000$
$A4 = -9.71161e-05, A6 = -1.76591e-06, A8 = -4.40666e-08,$
$A10 = -4.00000e-09$ 18th surface $k = 0.000$
$A4 = 2.02297e-05, A6 = -1.06127e-06, A8 = -1.47493e-07,$
$A10 = -8.32940e-10$ Zoom data (∞)

| | WE | ST | TE |
|---|---|---|---|
| IH | 3.84 | 3.84 | 3.84 |
| f (mm) | 4.53 | 14.89 | 30.44 |
| Fno. | 2.90 | 4.92 | 6.00 |
| 2ω (°) | 89.53 | 28.99 | 14.28 |
| BF | 3.24 | 5.99 | 5.00 |
| lens total length | 52.16 | 43.10 | 52.16 |
| d4 | 26.79 | 5.67 | 1.75 |
| d14 | 1.45 | 5.28 | 12.48 |
| d16 | 2.10 | 7.57 | 14.34 |
| d18 | 1.73 | 4.48 | 3.50 |

Unit focal length

| f1 = −12.55 | f2 = 10.83 | f3 = −20.87 | f4 = 14.30 |
|---|---|---|---|

EXAMPLE 2

| unit mm | | | | |
|---|---|---|---|---|
| Surface data | | | | |
| Surface no. | r | d | nd | vd |
| object plane | ∞ | ∞ | | |
| 1* | −74.085 | 0.70 | 1.85135 | 40.10 |
| 2* | 7.515 | 2.60 | | |
| 3* | 8.681 | 2.00 | 2.00179 | 19.31 |
| 4* | 12.705 | Variable | | |
| 5 (S) | ∞ | 0.00 | | |
| 6* | 6.637 | 2.50 | 1.49700 | 81.54 |
| 7* | −17.171 | 0.05 | | |
| 8 | 6.183 | 2.25 | 1.85135 | 40.10 |
| 9 | 42.241 | 0.50 | 2.00330 | 28.27 |
| 10 | 3.861 | 1.20 | | |
| 11 | 8.970 | 1.00 | 1.49700 | 81.54 |
| 12 | 21.203 | Variable | | |
| 13 | −7.462 | 0.70 | 1.49700 | 81.54 |
| 14 | −18.924 | Variable | | |
| 15* | 15.416 | 3.17 | 1.51633 | 64.14 |
| 16* | −12.516 | Variable | | |
| 17 | ∞ | 0.50 | 1.53996 | 59.45 |
| 18 | ∞ | 0.50 | | |
| 19 | ∞ | 0.49 | 1.51633 | 64.14 |
| 20 | ∞ | 0.36 | | |
| Image plane (Light receiving surface) | ∞ | | | |

Aspherical surface data

1st surface $k = 0.000$
$A4 = 4.29137e-04, A6 = -4.50999e-06, A8 = 1.99488e-08$

2nd surface $k = 0.000$
$A4 = -2.03591e-04, A6 = 1.79654e-05, A8 = -3.02319e-07,$
$A10 = -1.66204e-10$ 3rd surface $k = 0.000$
$A4 = -5.89201e-04, A6 = 1.10287e-05, A8 = 2.25865e-09$ 4th surface $k = 0.000$
$A4 = -3.39499e-04, A6 = 8.85413e-06, A8 = 1.07611e-07$ 6th surface $k = 0.000$
$A4 = -3.60000e-04, A6 = -5.82345e-06, A8 = -1.09751e-08$ 7th surface $k = 0.000$
$A4 = 1.52781e-04, A6 = -3.97734e-06, A8 = 1.74356e-07$ 15th surface $k = 0.000$
$A4 = -4.96638e-05, A6 = 6.61631e-07, A8 = -1.17857e-07,$
$A10 = -4.89841e-10$ 16th surface $k = 0.000$
$A4 = 2.37635e-04, A6 = -3.15619e-06, A8 = -3.45943e-08,$
$A10 = -1.43870e-09$ Zoom data (∞)

| | WE | ST | TE |
|---|---|---|---|
| IH | 3.84 | 3.84 | 3.84 |
| f (mm) | 4.53 | 14.89 | 30.44 |
| Fno. | 2.90 | 4.81 | 6.00 |
| 2ω (°) | 88.26 | 28.98 | 14.35 |

-continued unit mm

| | | | |
|---|---|---|---|
| BF | 2.58 | 5.88 | 4.01 |
| lens total length | 49.66 | 38.35 | 47.39 |
| d4 | 27.10 | 4.85 | 1.75 |
| d12 | 1.20 | 4.94 | 11.00 |
| d14 | 2.10 | 6.00 | 13.96 |
| d16 | 1.08 | 4.38 | 2.50 |

Unit focal length

| | | | |
|---|---|---|---|
| f1 = −13.44 | f2 = 10.41 | f3 = −25.30 | f4 = 13.92 |

EXAMPLE 3 unit mm

Surface data

| Surface no. | r | d | nd | vd |
|---|---|---|---|---|
| object plane | ∞ | ∞ | | |
| 1* | −58.252 | 0.69 | 1.76802 | 49.24 |
| 2* | 7.349 | 3.10 | | |
| 3* | 9.916 | 2.00 | 2.00179 | 19.31 |
| 4* | 13.854 | Variable | | |
| 5 (S) | ∞ | 0.00 | | |
| 6* | 9.029 | 1.80 | 1.51633 | 64.14 |
| 7* | −93.008 | 0.05 | | |
| 8 | 30.000 | 2.17 | 1.49700 | 81.54 |
| 9 | −16.435 | 0.05 | | |
| 10 | 9.171 | 2.29 | 1.85135 | 40.10 |
| 11 | −73.870 | 0.50 | 2.00330 | 28.27 |
| 12 | 5.453 | 1.10 | | |
| 13 | 70.957 | 1.30 | 1.49700 | 81.54 |
| 14 | −25.063 | Variable | | |
| 15 | −14.958 | 0.74 | 1.49700 | 81.54 |
| 16 | −31.945 | Variable | | |
| 17* | 13.560 | 2.78 | 1.77377 | 47.17 |
| 18* | 112.969 | Variable | | |
| 19 | ∞ | 0.50 | 1.53996 | 59.45 |
| 20 | ∞ | 0.50 | | |
| 21 | ∞ | 0.49 | 1.51633 | 64.14 |
| 22 | ∞ | 0.36 | | |
| Image plane (Light receiving surface) | ∞ | | | |

Aspherical surface data

1st surface k = 0.000
A4 = 5.49792e−04, A6 = −6.00000e−06, A8 = 1.95148e−08

2nd surface k = 0.000
A4 = 4.83437e−05, A6 = 1.20289e−05, A8 = 6.18006e−08,
A10 = −7.30695e−09

3rd surface k = 0.000
A4 = −5.00420e−04, A6 = 4.82138e−06, A8 = −1.97022e−08

4th surface k = 0.000
A4 = −4.09429e−04, A6 = 2.54425e−06

6th surface k = 0.000
A4 = −5.03622e−04, A6 = −9.27314e−06, A8 = −6.04749e−07

-continued unit mm

7th surface k = 0.000
A4 = −1.37694e−04, A6 = −9.18372e−06, A8 = −5.22518e−07

17th surface k = 0.000
A4 = 2.86793e−04, A6 = 5.56408e−06, A8 = 4.77748e−08,
A10 = 1.25740e−09

18th surface k = 0.000
A4 = 4.30000e−04, A6 = 7.00000e−06, A8 = 2.00000e−07,
A10 = 1.00000e−09

Zoom data (∞)

| | WE | ST | TE |
|---|---|---|---|
| IH | 3.84 | 3.84 | 3.84 |
| f (mm) | 4.52 | 11.53 | 23.60 |
| Fno. | 2.90 | 4.28 | 6.00 |
| 2ω (°) | 91.70 | 37.43 | 18.51 |
| BF | 3.24 | 5.59 | 5.00 |
| lens total length | 49.86 | 40.56 | 49.18 |
| d4 | 24.51 | 6.73 | 1.83 |
| d14 | 1.45 | 2.71 | 10.02 |
| d16 | 2.10 | 6.97 | 13.76 |
| d18 | 1.73 | 4.08 | 3.50 |

Unit focal length

| | | | |
|---|---|---|---|
| f1 = −12.93 | f2 = 11.51 | f3 = −57.43 | f4 = 19.68 |

EXAMPLE 4 unit mm

Surface data

| Surface no. | r | d | nd | vd |
|---|---|---|---|---|
| object plane | ∞ | ∞ | | |
| 1* | −133.360 | 0.69 | 1.76802 | 49.24 |
| 2* | 7.192 | 3.10 | | |
| 3* | 8.307 | 2.00 | 2.00179 | 19.31 |
| 4* | 10.180 | Variable | | |
| 5 (S) | ∞ | 0.00 | | |
| 6* | 8.477 | 1.80 | 1.51633 | 64.14 |
| 7* | −86.437 | 0.05 | | |
| 8 | 30.000 | 2.17 | 1.49700 | 81.54 |
| 9 | −18.060 | 0.05 | | |
| 10 | 8.910 | 2.29 | 1.85135 | 40.10 |
| 11 | −372.951 | 0.50 | 2.00330 | 28.27 |
| 12 | 5.200 | 1.00 | | |
| 13 | 19.292 | 1.30 | 1.49700 | 81.54 |
| 14 | 3373.312 | Variable | | |
| 15 | −11.798 | 0.74 | 1.49700 | 81.54 |
| 16 | −22.991 | Variable | | |
| 17* | 80.176 | 2.80 | 1.78590 | 44.20 |
| 18* | −17.341 | Variable | | |
| 19 | ∞ | 0.50 | 1.53996 | 59.45 |
| 20 | ∞ | 0.50 | | |
| 21 | ∞ | 0.49 | 1.51633 | 64.14 |
| 22 | ∞ | 0.36 | | |
| Image plane (Light receiving surface) | ∞ | | | |

-continued unit mm

Aspherical surface data

1st surface k = 0.000
A4 = 4.12592e−04, A6 = −4.30282e−06, A8 = 1.89043e−08

2nd surface k = 0.000
A4 = −1.37497e−04, A6 = 1.32943e−05, A8 = −2.00135e−07,
A10 = −4.97722e−10

3rd surface k = 0.000
A4 = −6.91922e−04, A6 = 5.32327e−06, A8 = −1.52923e−08

4th surface k = 0.000
A4 = −6.31360e−04, A6 = 6.46909e−06

6th surface k = 0.000
A4 = −4.21342e−04, A6 = −2.71867e−06, A8 = −1.11765e−07

7th surface k = 0.000
A4 = −2.53614e−05, A6 = −2.86488e−06, A8 = −6.13338e−08

17th surface k = 0.000
A4 = −1.74846e−04, A6 = −9.02334e−07, A8 = 6.10496e−08,
A10 = −1.95371e−09

18th surface k = 0.000
A4 = −1.01840e−04, A6 = −1.75332e−06, A8 = 8.58073e−08,
A10 = −1.87037e−09

Zoom data (∞)

|    | WE    | ST    | TE    |
|---|---|---|---|
| IH | 3.84 | 3.84 | 3.84 |
| f (mm) | 4.53 | 14.96 | 30.44 |
| Fno. | 2.90 | 4.91 | 5.91 |
| 2ω (°) | 84.19 | 26.67 | 13.25 |
| BF | 3.24 | 6.24 | 5.01 |
| lens total length | 52.52 | 42.73 | 52.73 |
| d4 | 27.24 | 5.62 | 1.75 |
| d14 | 1.45 | 5.24 | 16.31 |
| d16 | 2.10 | 7.14 | 11.17 |
| d18 | 1.73 | 4.74 | 3.50 |

Unit focal length

| f1 = −12.85 | f2 = 11.22 | f3 = −49.85 | f4 = 18.37 |
|---|---|---|---|

Aberration diagrams at the time of infinite object point focusing in the embodiments from the first embodiment to the fourth embodiment are shown in diagrams from FIG. 5A to FIG. 8C. In these aberration diagrams, FIG. 5A, FIG. 6A, FIG. 7A, and FIG. 8A show a spherical aberration (SA), an astigmatism (AS), a distortion (DT), and a chromatic aberration of magnification (CC) at the wide angle end, FIG. 5B, FIG. 6B, FIG. 7B, and FIG. 8B show a spherical aberration (SA), an astigmatism (AS), a distortion (DT), and a chromatic aberration of magnification (CC) in the intermediate state, and FIG. 5C, FIG. 6C, FIG. 7C, and FIG. 8C show a spherical aberration (SA), and astigmatism (AS), a distortion (DT), and a chromatic aberration of magnification (CC) at the telephoto end. In these diagrams, 'FIY' denotes the maximum image height.

Values of conditional expressions in each of examples are as shown below.

|  | Example 1 | Example 2 | Example 3 | Example 4 |
|---|---|---|---|---|
| (1) $(\beta_{2t}/\beta_{2w})/(\beta_{3t}/\beta_{3w})$ | 3.4 | 3.8 | 3.9 | 5.2 |
| (2) $f_2/f_t$ | 0.36 | 0.34 | 0.49 | 0.37 |
| (3) $\beta_{2t}/\beta_{2w}$ | 5.26 | 5.44 | 4.83 | 6.30 |
| (4) $mv_{2g}/f_2$ | 2.31 | 2.22 | 1.91 | 2.28 |
| (5) $(R_{2f} + R_{2b})/(R_{2f} - R_{2b})$ | 4.46 | 4.33 | 3.93 | 3.80 |
| (6) $N_{2n} - N_{2p}$ | 0.15 | 0.15 | 0.15 | 0.15 |
| (7) $\beta_{3t}/\beta_{3w}$ | 1.55 | 1.43 | 1.23 | 1.21 |
| (8) $mv_{2g}/mv_{3g}$ | 1.79 | 1.74 | 1.64 | 2.38 |
| (9) $v_{3GP}$ | 81.54 | 81.54 | 81.54 | 81.54 |
| (10) $f_T/f_W$ | 6.73 | 6.73 | 5.22 | 6.73 |
| (A) $f_{22}/f_{23}$ | −0.43 | −0.49 | −0.39 | −0.36 |

Data at a time when distortion is electrically corrected.

| | | | | |
|---|---|---|---|---|
| Residual amount of distortion at wide angle end: | −3.00 | −3.00 | −3.00 | −3.00 |
| Half angle of field at wide angle end | 42.739 | 42.836 | 42.837 | 42.67 |
| Angle of field at wide angle end | 85.478 | 85.672 | 85.674 | 85.34 |
| Image height at wide angle end | 3.595 | 3.624 | 3.569 | 3.604 |

(Correction of Distortion)

Incidentally, when the zoom lens system of the present invention is used, a digital correction of distortion of an image is carried out electrically. A basic concept for the digital correction of the distortion of an image will be described below.

Figure 9:
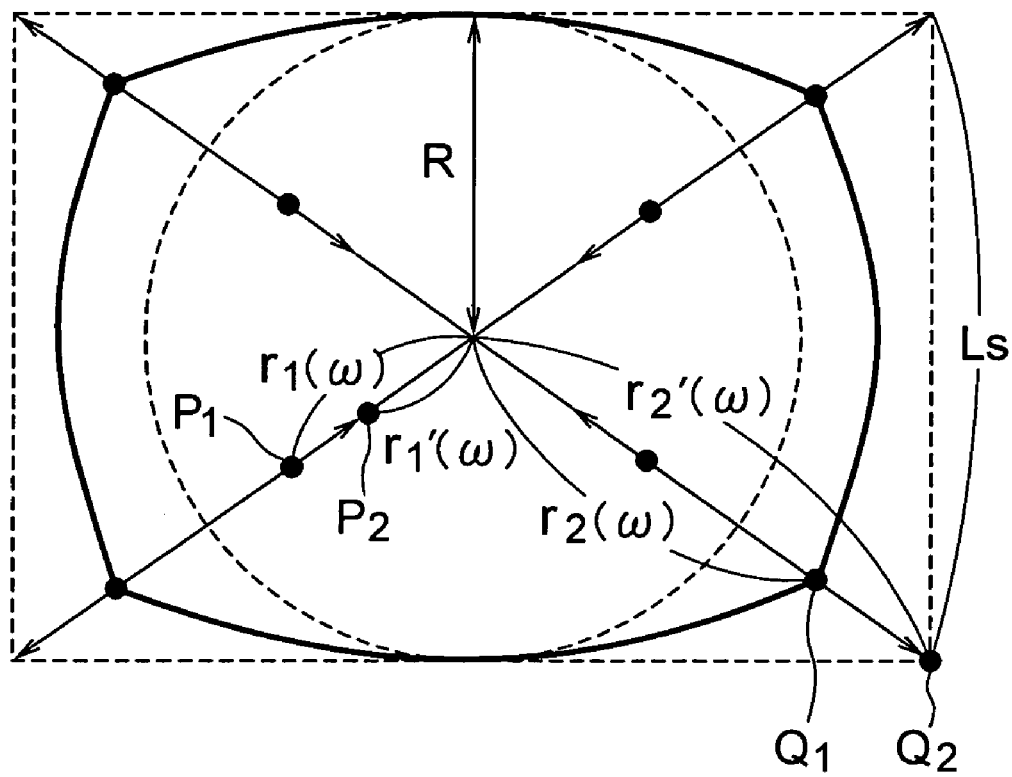
FIG. 9 is a diagram describing a correction of a distortion.

For example, as shown in FIG. 9, with a point of intersection of an optical axis and an image pickup plane to be a center, a magnification on a circumference (image height) of a circle of radius R making a contact internally with a longer side of an effective image pickup plane is fixed, and this circumference is let to be a base reference for the correction. Next, each point on a circumference (image height) of an arbitrary radius r(ω) other than the radius R is moved in a substantial direction of radiation, and the correction is carried out by moving on a concentric circle such that the radius becomes r'(ω).

For example, in FIG. 9, a point $P_1$ on a circumference of an arbitrary radius $r_1(\omega)$ positioned at an inner side of a circle of radius R is moved to a point $P_2$ on a circumference of a radius $r_1'(\omega)$ which is to be corrected, directed toward a center of the circle. Moreover, a point $Q_1$ on a circumference of an arbitrary radius $r_2(\omega)$ positioned at an outer side of the circle of radius R is moved to a point $Q_2$ on a circumference of a radius $r_2'(\omega)$ which is to be corrected, directed toward a direction away from the center of the circle.

Here, r'(ω) can be expressed as follows.

$$r'(\omega) = \alpha \cdot f \tan \omega (0 \leq \alpha \leq 1)$$

where, ω is a half angle of field of an object and f is a focal length of an imaging optical system (the zoom lens system in the present invention).

Here, when an ideal image height corresponding to a circle (image height) of radius R is let to be Y, then $$\alpha = R/Y = R/(f \tan \omega).$$

The optical system, ideally, is rotationally symmetric with respect to an optical axis. In other words, the distortion also occurs in a rotationally symmetric manner with respect to the optical axis. Consequently, as it has been described above, in a case of correcting electrically the optical distortion, when it is possible to carry out correction by fixing a magnification on a circumference (image height) of the circle of radius R making a contact internally with a longer side of the effective image pickup plane, with a point of intersection of an optical axis on a reproduced image, and an image pickup plane to be a center, and moving each point on the circumference (image height) of radius r(ω) other than the radius R in a substantial direction of radiation, and moving on a concentric circle such that the radius becomes r'(ω), it can be considered to be advantageous from a point of amount of data and amount of calculation.

Incidentally, an optical image ceases to be a continuous amount at a point of time when an image is picked up by an electronic image pickup element (due to sampling). Consequently, the circle of radius R which is drawn exactly on the optical image ceases to be an accurate circle as long as pixels on the electronic image pickup element are not arranged radially.

In other words, regarding a shape correction of image data expressed for each discrete coordinate point, a circle which can fix the magnification does not exist. Therefore, for each pixel (Xi, Yj), a method of determining coordinates of a destination of movement (Xi', Yj') may be used. When two or more points (Xi, Yj) have moved to the coordinates (Xi', Yj'), an average of values of each pixel is taken. Moreover, when there is no point which has moved, interpolation may be performed by using a value of coordinate (Xi', Yj') of some of the surrounding pixels.

Such method is effective for correction when the distortion with respect to the optical axis is remarkable due to a manufacturing error etc. of the optical system or the electronic image pickup element, in the electronic image pickup apparatus having the zoom lens system in particular, and when the circle of the radius R drawn on the optical image is asymmetric. Moreover, it is effective for correction when there occurs to be a geometric distortion at the time of reproducing a signal to an image in an image pickup element or various output devices.

In the electronic image pickup apparatus of the present invention, for calculating a correction amount r'(ω)−r(ω), an arrangement may be made such that a relationship between r(ω), in other words, half angle of field and the image height, or a relationship between a real image height r and an ideal image height r'/α is recorded in a recording medium which is built-in in the electronic image pickup apparatus.

For an image after the distortion correction, not to have an extreme shortage of an amount of light at both ends in a direction of short side, the radius R may satisfy the following conditional expression.

$$0 \leq R \leq 0.6 Ls$$

where, Ls is a length of a short side of the effective image pickup surface.

It is preferable that the radius R satisfies the following conditional expression.

$$0.3 Ls \leq R \leq S0.6 Ls$$

Furthermore, it is most advantageous to match the radius R with a radius of a circle making an internal contact in a short side direction of a substantially effective image pickup plane. In a case of correction in which, the magnification is fixed near the radius R=0, in other words, near on the axis, it is somewhat disadvantageous from an aspect of substantial number of images, but it is possible to secure an effect for making the size small even when the angle is widened.

A focal length interval which requires a correction is divided into a number of focal point zones. Moreover, the correction may be carried out with the amount of correction as in a case in which, a correction result which satisfies substantially the following relationship $$r'(\omega) = \alpha \cdot f \tan \omega$$

near a telephoto end in the focal point zones which are divided.

However, in this case, at a wide angle end in the focal point zones which are divided, a barrel-shape distortion at the wide angle end of the focal point zones which are divided is remained to some extent. Moreover, when the number of divided zones is increased, there arises a need to hold specific data necessary for correction, additionally in a recording medium. Therefore it is not preferable to increase the number of divided zones. Therefore, one or a plurality of coefficients associated with each focal length in the focal point zones which are divided, are calculated in advance. The coefficients may be determined based on a measurement by simulation or by actual equipment.

An amount of correction in a case in which, the correction result which satisfies substantially the following relationship $$r'(\omega) = \alpha \cdot f \tan \omega$$

near the telephoto end in the focal point zones which are divided may be calculated, and may let to be a final amount of correction by multiplying uniformly the coefficient for each focal length with respect to this amount of correction.

Incidentally, when there is no distortion in an image achieved by imaging (forming an image) of an infinite object, the following relationship $$f = y / \tan \omega$$

holds.

Here, y denotes a height (image height) of an image point from the optical axis, f denotes a focal length of an imaging system (zoom lens system in the present invention), and ω denotes an angle (object half angle of field) with respect to the optical axis in an object point direction corresponding to image points connecting from a center on an image pickup plane up to a position of y.

When there is a barrel-shape distortion in the imaging system, the relationship becomes $$f > y / \tan \omega.$$

In other words, when the focal length f of the imaging system, and the image height y are let to be fixed, a value of ω becomes large.

(Digital Camera)

Figure 10:
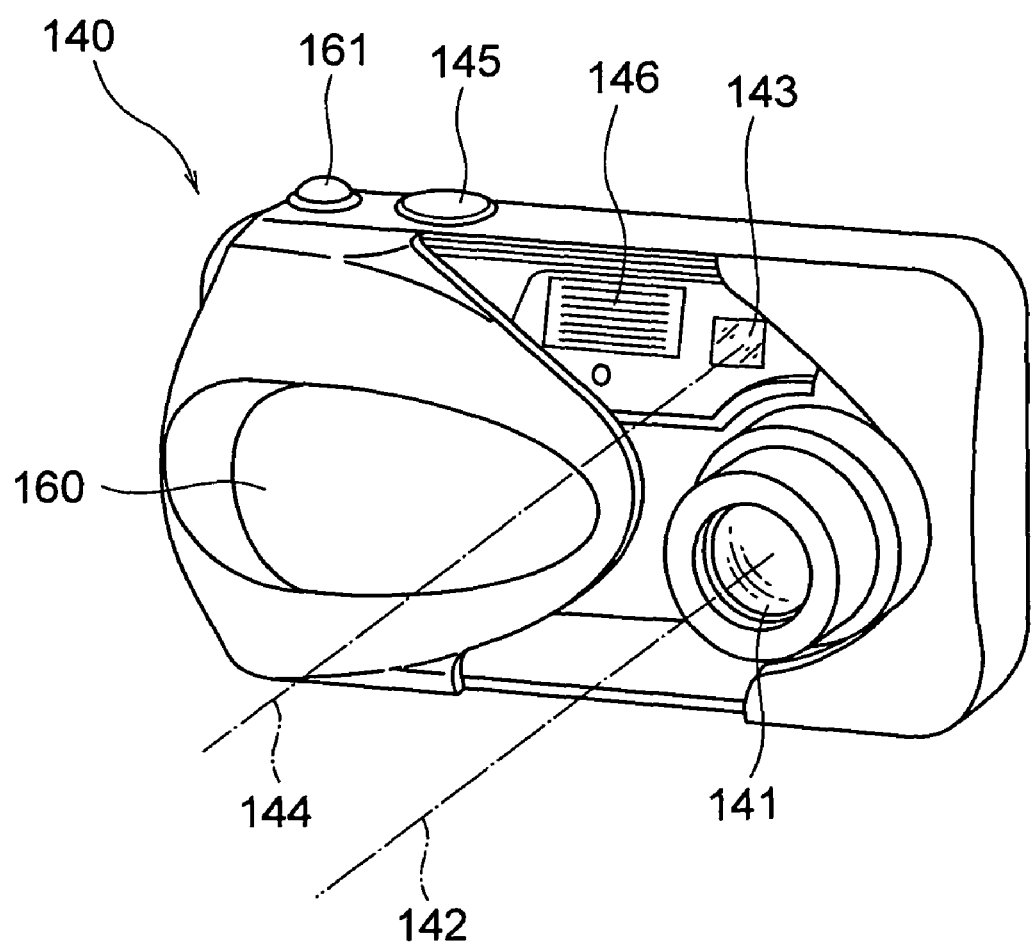
FIG. 10 is a front perspective view showing an appearance of a digital camera in which, a zoom lens system according to the present invention is incorporated.
Figure 11:
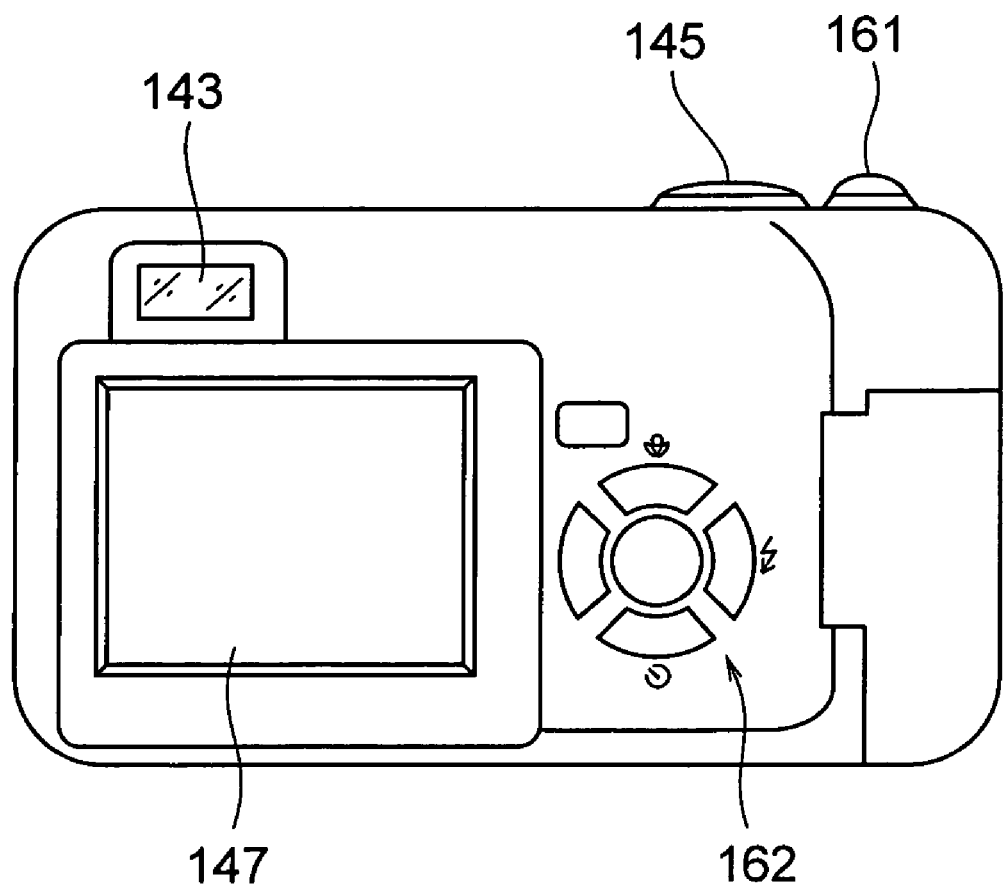
FIG. 11 is a rear perspective view of the digital camera.
Figure 12:
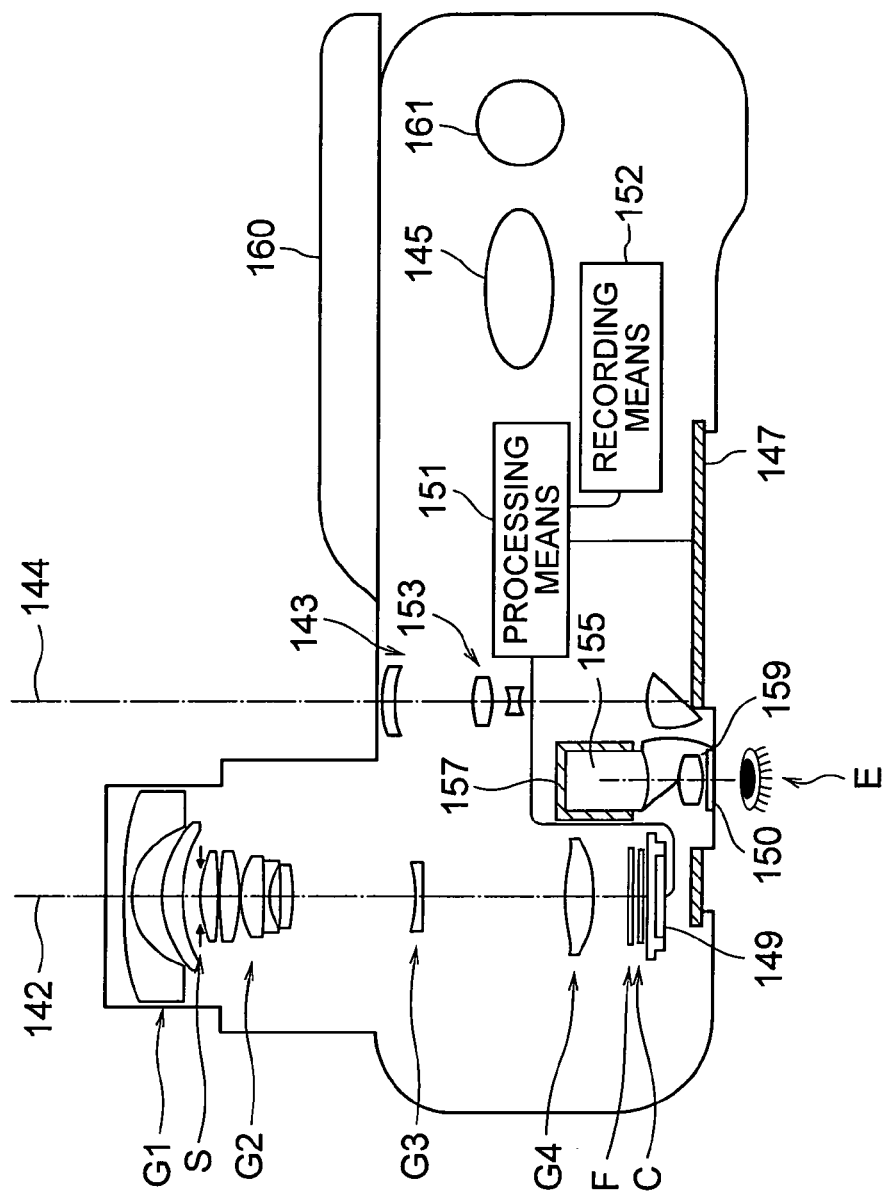
FIG. 12 is a cross-sectional view of the digital camera.

FIG. 10 to FIG. 12 are conceptual diagrams of a structure of a digital camera according to the present invention in which a zoom lens system described above is incorporated in a taking optical system 141. FIG. 10 is a front perspective view showing an appearance of a digital camera 140, FIG. 11 is a rear view of the same, and FIG. 12 is a schematic cross-sectional view showing a structure of the digital camera 140. In FIG. 10 and FIG. 12, show an uncollapsed state of the taking optical system 141. The digital camera 140, in a case of this example, includes the taking optical system 141 having a taking optical path 142, a finder optical system 143 having a finder optical path 144, a shutter button 145, a flash 146, a liquid-crystal display monitor 147, a focal-length changing button 161, and a setting changing switch 162 etc., and in the uncollapsed state of the taking optical system 141, by sliding a cover 160, the taking optical system 141, the finder optical system 143, and the flash 146 are covered by the cover 160. Further, when the cover 160 is opened and the digital camera is set in a photo taking state, the taking optical system 141 assumes the uncollapsed state as shown in FIG. 10, when the shutter button 145 disposed on an upper portion of the digital camera 140 is pressed, in synchronization with the pressing of the shutter button 145, a photograph is taken by the taking optical system 141 such as the zoom lens system in the first embodiment. An object image formed by the taking optical system 141 is formed on an image pickup surface of a CCD 149 via a cover glass C and a low pass filter on which a wavelength region restricting coating is applied. An object image which is received as light by the CCD 149 is displayed on the liquid-crystal display monitor 147 which is provided on a rear surface of the digital camera 140 as an electronic image, via a processing means 151. Moreover, a recording means 152 is connected to the processing means 151, and it is also possible to record the electronic image which is taken. The recording means 152 may be provided separately from the processing means 151, or may be formed by recording by writing electronically in a flexible disc, a memory card, or an MO etc. Moreover, the camera may be formed as a silver-salt camera in which a silver-salt film is disposed instead of the CCD 149.

Furthermore, a finder objective optical system 153 is disposed on the finder optical path 144. The finder objective optical system 153 consists of a plurality of lens units (three units in the diagram), and two prisms, and is made of a zoom optical system in which a focal length changes in synchronization with a zoom lens system of the taking optical system 141. An object image formed by the finder objective optical system 153 is formed on a field frame 157 of an erecting prism 155 which is an image erecting member. On a rear side of the erecting prism 155, an eyepiece optical system 159 which guides an erected image to a viewer's eyeball, is disposed. A cover member 150 is disposed on an emergence side of the eyepiece optical system 159.

Since the digital camera 140 structured in such manner has the taking optical system 141 according to the present invention, has an extremely small thickness in collapsed state, and an extremely stable imaging performance in the entire zooming region at high magnification, it is possible to realize a high-performance, a small size, and a widening of angle of field.

(Internal Circuit Structure)

Figure 13:
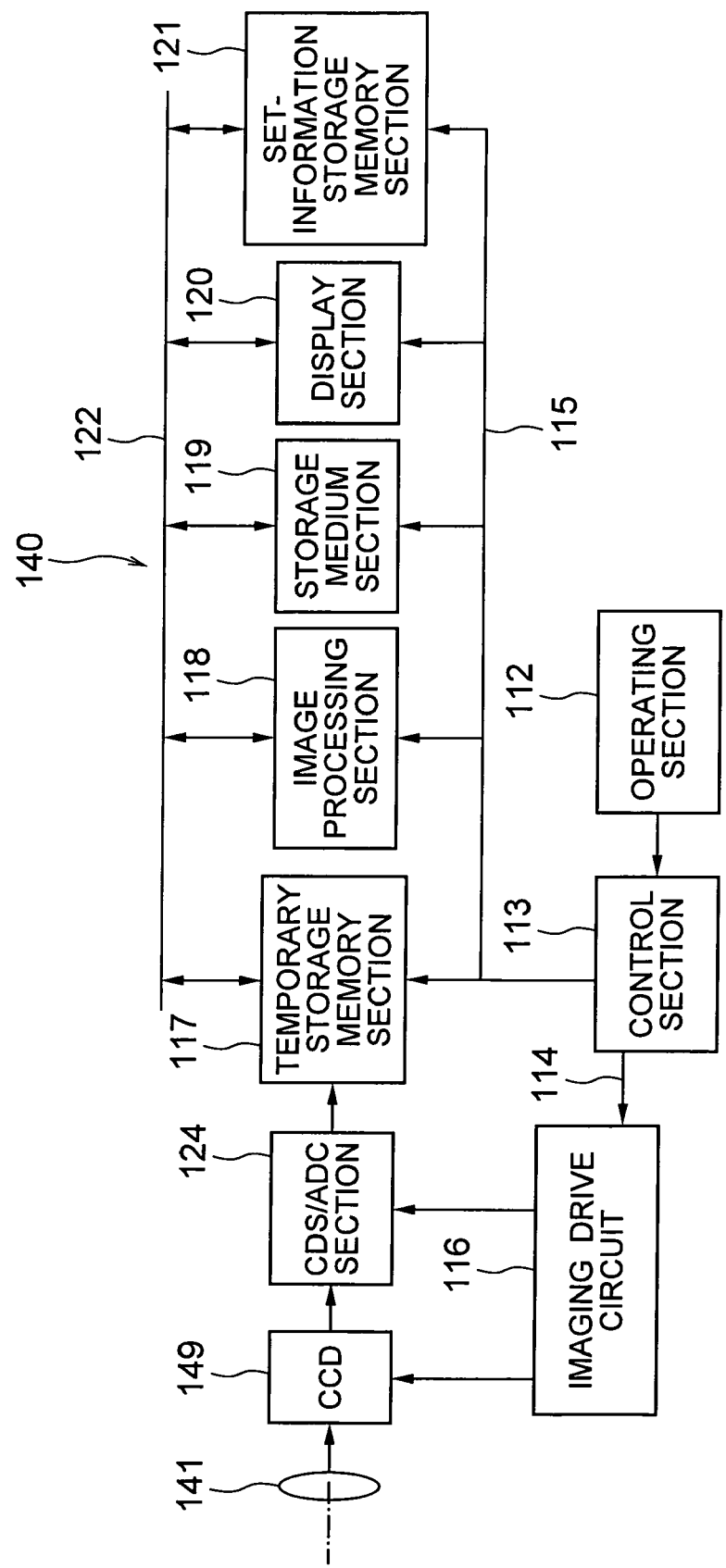
FIG. 13 is a structural block diagram of an internal circuit of main components of a digital camera.

FIG. 13 is a structural block diagram of an internal circuit of main components of the digital camera 140. In the following description, the processing means 151 described above includes for instance, a CDS/ADC section 124, a temporary storage memory 117, and an image processing section 118, and a storage means 152 consists of a storage medium section 119 for example.

As shown in FIG. 13, the digital camera 140 includes an operating section 112, a control section 113 which is connected to the operating section 112, the temporary storage memory 117 and an imaging drive circuit 116 which are connected to a control-signal output port of the control section 113, via a bus 114 and a bus 115, the image processing section 118, the storage medium section 119, a display section 120, and a set-information storage memory section 121.

The temporary storage memory 117, the image processing section 118, the storage medium section 119, the display section 120, and the set-information storage memory section 121 are structured to be capable of mutually inputting and outputting data via a bus 122. Moreover, the CCD 149 and the CDS/ADC section 124 are connected to the imaging drive circuit 116.

The operating section 112 includes various input buttons and switches, and is a circuit which informs the control section, event information which is input from outside (by a user of the digital camera) via these input buttons and switches.

The control section 113 is a central processing unit (CPU), and has a built-in computer program memory which is not shown in the diagram. The control section 113 is a circuit which controls the entire digital camera 140 upon receiving instructions and commands input by the user of the camera via the operating section 112, according to a computer program stored in this computer program memory.

The CCD 149 receives as light an object image which is formed via the taking optical system 141 according to the present invention. The CCD 149 is an image pickup element which is driven and controlled by the imaging drive circuit 116, and which converts an amount of light for each pixel of the object image to an electric signal, and outputs to the CDS/ADC section 124.

The CDS/ADC section 124 is a circuit which amplifies the electric signal which is input from the CCD 149, and carries out analog/digital conversion, and outputs to the temporary storage memory 117 image raw data (bare data, hereinafter called as 'RAW data') which is only amplified and converted to digital data.

The temporary storage memory 117 is a buffer which includes an SDRAM (Synchronous Dynamic Random Access Memory) for example, and is a memory device which stores temporarily the RAW data which is output from the CDS/ADC section 124. The image processing section 118 is a circuit which reads the RAW data stored in the temporary storage memory 117, or the RAW data stored in the storage medium section 119, and carries out electrically various image-processing including the distortion correction, based on image-quality parameters specified by the control section 113.

The storage medium section 119 is a recording medium in the form of a card or a stick including a flash memory for instance, detachably mounted. The storage medium section 119 is a control circuit of a device in which, the RAW data transferred from the temporary storage memory 117 and image data subjected to image processing in the image processing section 118 are recorded and maintained in the card flash memory and the stick flash memory.

The display section 120 includes the liquid-crystal display monitor, and is a circuit which displays images and operation menu on the liquid-crystal display monitor. The set-information storage memory section 121 includes a ROM section in which various image quality parameters are stored in advance, and a RAM section which stores image quality parameters which are selected by an input operation on the operating section 112, from among the image quality parameters which are read from the ROM section. The set-information storage memory section 121 is a circuit which controls an input to and an output from the memories.

The digital camera 140 structured in such manner has the taking optical system 141, according to the present invention, which, while having a sufficient wide angle region, and a compact structure, has an extremely stable imaging performance in the entire magnification region at a high magnification. Therefore, it is possible to realize the high performance, the small size, and widening of the angle. Moreover, a prompt focusing operation at the wide angle side and the telephoto side is possible.

As it has been described above, the present invention is advantageous for small sizing and for securing a wide angle of field and high zooming ratio, and is advantageous for a zoom lens system in which an image quality of photographic image is maintained to be favorable, and in particular, is suitable for an image pickup apparatus which includes an electronic image pickup element such as a CCD and a CMOS.

According to the present invention, it is possible to provide a zoom lens system which is advantageous for securing a wide angle of field and a high zooming ratio, and which is suitable for an image pickup element such as a CCD and a CMOS.

Moreover, it is possible to provide a zoom lens system which is advantageous for a small sizing and a low cost.

Furthermore, it is possible to provide an image pickup apparatus which includes such zoom lens system.

What is claimed is:

1. A zoom lens system comprising, in order from an object side to an image side:
   a first lens unit having a negative refracting power;
   a second lens unit having a positive refracting power;
   a third lens unit having a negative refracting power; and
   a fourth lens unit having a positive refracting power, wherein
   at the time of zooming from a wide angle end to a telephoto end, distances between the lens units change by at least the first lens unit, the second lens unit, and the third lens unit being moved; and
   the second lens unit comprises in order from the object side, a first sub-unit having a positive refracting power, a second sub-unit having a negative refracting power, and a third sub-unit having a positive refracting power, and
   a surface on the object side and a surface on the image side of each of the first sub-unit, the second sub-unit, and the third sub-unit are in contact with air, and
   the second lens unit does not include other sub-units, and satisfies the following conditional expression (1)

$$3.2<(\beta_{2t}/\beta_{2w})/(\beta_{3t}/\beta_{3w})<7 \tag{1}$$

where,
$\beta_{2t}$ denotes a lateral magnification at the telephoto end of the second lens unit,
$\beta_{2w}$ denotes a lateral magnification at the wide angle end of the second lens unit,
$\beta_{3t}$ denotes a lateral magnification at the telephoto end of the third lens unit, and
$\beta_{3w}$ denotes a lateral magnification at the wide angle end of the third lens unit.

2. The lens system according to claim 1, wherein the second lens unit satisfies the following conditional expression (2)

$$0.2<f_2/f_t<0.7 \tag{2}$$

where,
$f_2$ denotes a focal length of the second lens unit, and
$f_t$ denotes a focal length of the entire zoom lens system at the telephoto end.

3. The zoom lens system according to claim 1, wherein the second lens unit satisfies the following conditional expression (3)

$$2<\beta_{2t}/\beta_{2w}<7 \tag{3}$$

4. The zoom lens system according to claim 1, wherein the second lens unit satisfies the following conditional expression (4)

$$1<mv_{2g}/f_2<3.5 \tag{4}$$

where,
$mv_{2g}$ denotes a difference of a position at the telephoto end with respect to a position at the wide angle end of the second lens unit, letting a movement toward the object side to have a positive sign, and
$f_2$ denotes a focal length of the second lens unit.

5. The zoom lens system according to claim 1, wherein a combined refracting power of the second sub-unit and the third sub-unit is negative.

6. The zoom lens system according to claim 5, wherein the second sub-unit and the third sub-unit satisfy the following conditional expression (A)

$$-0.7<f_{22}/f_{23}<-0.25 \tag{A}$$

where,
$f_{22}$ denotes a focal length of the second sub-unit in the second lens unit, and
$f_{23}$ denotes a focal length of the third sub-unit in the second lens unit.

7. The zoom lens system according to claim 1, wherein the second sub-unit consists of one cemented lens component having a negative refracting power.

8. The zoom lens system according to claim 7, wherein the cemented lens component which is the second sub-unit has a convex meniscus lens component toward the object side, and satisfies the following conditional expression (5)

$$3<(R_{2f}+R_{2b})/(R_{2f}-R_{2b})<10 \tag{5}$$

where,
$R_{2f}$ denotes a paraxial radius of curvature of a surface on the object side, of the cemented lens component, and
$R_{2b}$ denotes a paraxial radius of curvature of a surface on the image side, of the cemented lens component.

9. The zoom lens system according to claim 7, wherein the cemented lens component in the second lens unit comprises in order from the object side, a biconvex positive lens and a biconcave negative lens, and satisfies the following conditional expression (6)

$$0.1<N_{2n}-N_{2p}<0.7 \tag{6}$$

where,
$N_{2n}$ denotes a refractive index for a d-line of the biconcave negative lens, and
$N_{2p}$ denotes a refractive index for a d-line of the biconvex positive lens.

10. The zoom lens system according to claim 1, comprising:
    an aperture stop which is disposed between the first lens unit and the third lens unit, and which moves integrally with the second lens unit at the time of zooming from the wide angle end to the telephoto end.

11. The zoom lens system according to claim 1, wherein the third sub-unit consists of a single lens having a positive refracting power.

12. The zoom lens system according to claim 1, wherein the first sub-unit consists of two positive lenses.

13. The zoom lens system according to claim 1, wherein the first sub-unit consists of one positive lens.

14. The zoom lens system according to claim 1, wherein the first lens unit comprises in order from the object side, a negative lens component and a positive lens component, and
    the total number of lens components in the first lens unit is two.

15. The zoom lens system according to claim 14, wherein the positive lens component in the first lens unit has an aspheric surface.

16. The zoom lens system according to claim 14, wherein the negative lens component in the first lens unit has a surface on the object side which is an aspheric surface having a concave surface at a center and a convex surface at a periphery, and a surface on the image side which is a concave surface, and the positive lens component in the first lens unit is a meniscus lens component which is convex on the object side.

17. The zoom lens system according to claim 1, wherein the total number of lens components in the second lens unit is three or four.

18. The zoom lens system according to claim 17, wherein the total number of lens elements in the second lens unit is four or five.

19. The zoom lens system according to claim 1, wherein the third lens unit satisfies the following conditional expression (7)

$$1<\beta_{3t}/\beta_{3w}<2.5 \qquad (7)$$

where, $\beta_{3t}$ denotes a lateral magnification at the telephoto end of the third lens unit, and $\beta_{3w}$ denotes a lateral magnification at the wide angle end of the third lens unit.

20. The zoom lens system according to claim 1, wherein the second lens unit and the third lens unit are positioned toward the object side at the telephoto end than a position at the wide angle end, and a distance between the second lens unit and the third lens unit widens at the telephoto end than at the wide angle end.

21. The zoom lens system according to claim 20, wherein the third lens unit satisfies the following conditional expression (8)

$$1.2<mv_{2g}/mv_{3g}<5 \qquad (8)$$

where, $mv_{2g}$ denotes a difference of a position at the telephoto end with respect to a position at the wide angle end of the second lens unit, letting a movement toward the object side to have a positive sign, and $mv_{3g}$ denotes a difference of a position at the telephoto end with respect to a position at the wide angle end of the third lens unit, letting a movement toward the object side to have a positive sign.

22. The zoom lens system according to claim 1, wherein the third lens unit comprises a negative lens component, and the total number of lens components in the third lens unit is one.

23. The zoom lens system according to claim 22, wherein the negative lens component in the third lens unit is a negative single lens, and the negative single lens satisfies the following conditional expression (9)

$$\nu_{3GP}>35 \qquad (9)$$

where, $\nu_{3GP}$ denotes Abbe's number of the negative single lens which forms the third lens unit.

24. The zoom lens system according to claim 1, wherein the fourth lens unit is a lens unit which is disposed nearest to the image side among all the lens units in the zoom lens system, and the fourth lens unit comprises only one lens component, and the fourth lens unit moves at the time of focusing and zooming from the wide angle end to the telephoto end.

25. The zoom lens system according to claim 1, wherein the zoom lens system satisfies the following conditional expression (10)

$$3.0<f_t/f_w< \qquad (10)$$

where, $f_w$ denotes a focal length of the entire zoom lens system at the wide angle, and $f_t$ denotes a focal length of the entire zoom lens system at the telephoto end.

26. An image pickup apparatus comprising:

a zoom lens system;

an image pickup element which has an image pickup surface which is disposed on an image side of the zoom lens system, and which converts an image on the image pickup surface formed by the zoom lens system to an electric signal; and an image converting section which converts an electric signal including a distortion due to the zoom lens system, into an image signal in which, the distortion is corrected by image processing, wherein the zoom lens system is a zoom lens system according to claim 1.

* * * * *